United States Patent [19]
Jouper et al.

[11] Patent Number: 5,754,445
[45] Date of Patent: May 19, 1998

[54] LOAD DISTRIBUTION AND MANAGEMENT SYSTEM

[75] Inventors: Jeffrey Jouper, Renton; Susan Nellis, Redmond; Darrell T. Hambley, Arlington; Mark A. Peabody, Redmond, all of Wash.

[73] Assignee: Primex Technologies, Inc., Redmond, Wash.

[21] Appl. No.: 580,028

[22] Filed: Dec. 20, 1995

[51] Int. Cl.$^6$ .................................................. H02J 13/00
[52] U.S. Cl. ................................... 364/492; 364/483
[58] Field of Search .............................. 364/492, 483, 364/493; 361/78, 88; 307/11, 31, 34, 35, 38, 39; 363/72; 395/750

[56] References Cited

U.S. PATENT DOCUMENTS

| | | | |
|---|---|---|---|
| 4,075,699 | 2/1978 | Schneider et al. | 364/492 |
| 4,370,562 | 1/1983 | Palazzetti et al. | 307/38 |
| 5,191,520 | 3/1993 | Eckersley | 363/72 |
| 5,436,510 | 7/1995 | Gilbert | 307/38 |
| 5,483,656 | 1/1996 | Oprescu et al. | 395/750 |

*Primary Examiner*—James P. Trammell
*Assistant Examiner*—M. Kemper
*Attorney, Agent, or Firm*—Gregory S. Rosenblatt; Thomas F. Presson; Wiggin & Dana

[57] ABSTRACT

An apparatus for and method of managing and distributing power from a supply of limited of power is described. A plurality of outlets are connect to a plurality of power units. As additional outlets are used, the invention measures the amount of power drawn by the outlets. Outlets are enabled if the amount of measured power is less than a maximum amount of power available. Additional outlets not currently in use are disabled if the amount of measured power is greater than the maximum amount of power available.

10 Claims, 47 Drawing Sheets

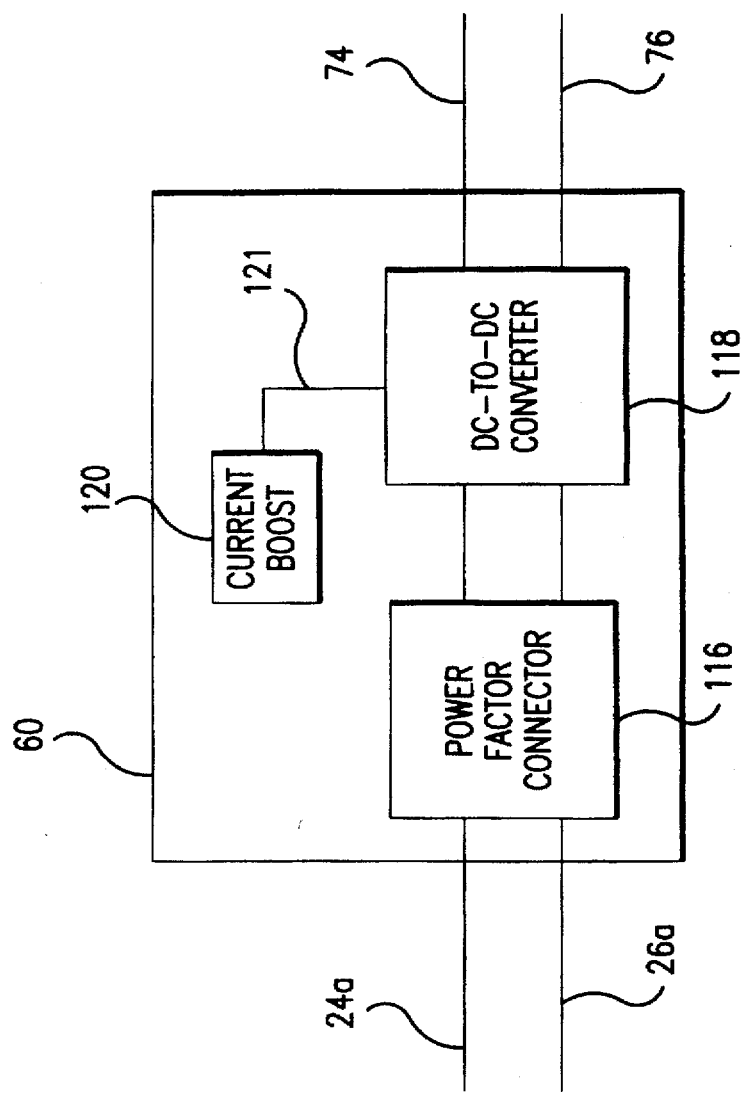

| MAIN BOARD CONNECTOR | P4 | | P5 | DAUGHTER BOARD CONNECTOR |
|---|---|---|---|---|
| RDC− | 1 | | 1 | RDC−D |
| GND1 | 2 | | 2 | GND1D |
| AUX | 3 | | 3 | AUXD |
| FETSW_PFC | 4 | | 4 | FETSW_PFCD |
| ISENSE_AUX | 5 | | 5 | ISENSE_AUXD |
| FETSW_AUX | 6 | | 6 | FETSW_AUXD |
| ISENSE_DCB | 7 | | 7 | ISENSE_DCBD |
| RDC+ | 8 | | 8 | RDC+D |
| GND1 | 9 | | 9 | GND1D |
| ISENSE_DCA | 10 | | 10 | ISENSE_DCAD |
| AUXL | 11 | | 11 | AUXLD |
| FETSW_DCA | 12 | | 12 | FETSW_DCAD |
| VSENSE_PFC | 13 | | 13 | VSENSE_PFCD |
| GND1 | 14 | | 14 | PGND_DCBD |
| GND1 | 15 | | 15 | GND1D |
| UV_SENSE | 16 | | 16 | UV_SENSED |
| GND1 | 17 | | 17 | PGND_DCAD |
| HOLD_OFF_A | 18 | | 18 | HOLD-OFF_AD |
| FETSW_DCB | 19 | | 19 | FETSW_DCBD |
| SYS_AV | 20 | | 20 | SYS_AVD |
| HOLD_OFF_B | 21 | | 21 | HOLD_OFF_BD |
| GND1 | 22 | | 22 | GND1D |
| LOGIC_RTN | 23 | | 23 | LOGIC_RTND |
| LOGIC_RTN | 24 | | 24 | LOGIC_RTND |
| SYS_AV_OUT_B | 25 | | 25 | SYS_AV_OUT_BD |
| SYS_AV_OUT_A | 26 | | 26 | SYS_AV_OUT_AD |
| PS_ENABLE_B | 27 | | 27 | PS_ENABLE_BD |
| PS_ENABLE_A | 28 | | 28 | PS_ENABLE_AD |
| CCEN_B | 29 | | 29 | CCEN_BD |
| CCEN_A | 30 | | 30 | CCEN_AD |
| FAULT_IFE_B | 31 | | 31 | FAULT_IFE_BD |
| FAULT_IFE_A | 32 | | 32 | FAULT_IFE_AD |
| REQ_POW_B | 33 | | 33 | REQ_POW_BD |
| REQ_POW_A | 34 | | 34 | REQ_POW_AD |
| OVUV_B | 35 | | 35 | OVUV_BD |
| OVUV_A | 36 | | 36 | OVUV_AD |
| FAULT | 37 | | 37 | FAULTD |
| OUT_RTN | 38 | | 38 | OUT_RTND |
| OUTPUTB+ | 39 | | 39 | OUTPUTB+D |
| OUTPUTA+ | 40 | | 40 | OUTPUTA+D |
| | CON40 | | CON40 | |

FIG.61

LOAD DISTRIBUTION AND MANAGEMENT SYSTEM

BACKGROUND OF THE INVENTION

1. Field of the Invention

This invention relates to supplying power to one or more electrical loads. More specifically, this invention relates to managing the supply of power to one or more loads in a limited power environment.

2. Description of the Related Art

Transportation systems, such as a aircraft, a ship, or a train, typically provide only a limited supply of power. This power supply serves not only those systems that are essential, but non-essential equipment as well. In an aircraft, for example, the propulsion system provides a finite amount of power to operate both essential equipment, such as life-support, communication, and flight control, and non-essential equipment, such as coffee makers, in-flight commercial phones, and in-seat entertainment centers.

Because power is limited, non-essential equipment must compete with other non-essential equipment for power. If the load from non-essential equipment exceeds the allowable load, some essential equipment may be deprived of power. Furthermore, the power supply itself may be damaged from the additional loads.

Conventional power monitoring systems measure the amount of power being drawn from a power supply. When the amount of power being drawn of the power supply exceeds a limit, these power monitoring systems determine which equipment to turn off or cause the equipment to enter power saving modes. These techniques of monitoring and adjusting power requirements of load is commonly referred to as "load-shedding."

Load-shedding systems typically require a controller to individually communicate whether a loads is to be shed or reconfigured. In such systems, each load can be provided its own communication control line or all of the loads an be daisy chained.

Some load monitoring systems allows a plurality of load control units to determine which loads to shed or reconfigure based on a consumption rate broadcast from a control monitoring processor.

Conventional power monitoring and control systems are complex and typically involve a priority scheme based on load importance.

Accordingly, a load distribution and management system is needed that prevents excessive power consumption while maximizing availability of power to simultaneous loads.

Furthermore, a load dustribution and management system is needed that prevent additional load from coming on-line until additional power is available and does not need to shed current loads.

SUMMARY OF THE INVENTION

Accordingly, the present invention is directed to a power that substantially obviates one or more of the problems due to limitations and disadvantages of the related art.

In accordance with the purpose of the invention, as embodied and broadly described, a load distribution and management system comprises a power distribution circuit adapted to receive power for distributing power and indicating whether additional power is available and at least one power unit connected to the power distribution circuit for providing power to at least one power outlet when additional power is available.

In another aspect of the invention the power distribution circuit comprises a power input for receiving power, a power sense circuit connected between the power input and each at least one power unit for sensing the amount of power drawn by each at least one power unit, a total power sense circuit connected to each of the power sense circuits for determining the total amount of power drawn by each of the at least one power units, a maximum power available circuit for supplying a maximum amount of power available, and a comparator connected to the total power sense circuit and the maximum power available circuit for comparing the total amount of power and the maximum amount of power and indicating whether additional power is available.

In another aspect, the invention includes a current boost circuit for providing temporary additional power when power is started to an outlet.

In still another aspect of the invention a method is provided that manages and distributes power from a supply of limited of power, including the steps of providing a plurality of outlets, measuring an amount of power drawn by the plurality of outlets, enabling the plurality of outlets if the amount of measured power is less than a maximum amount of power available, and preventing enabling of the plurality of outlets if the amount of measured power is greater than the maximum amount of power available.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description, serve to explain the principles of the invention.

BRIEF DESCRIPTION OF THE DRAWINGS

In the drawings,

FIG. 4 is a more detailed illustration of a converter of FIG. 2 according to a preferred embodiment of the present invention;

DETAILED DESCRIPTION OF THE INVENTION

Reference will now be made in detail to the present preferred embodiments of the invention, examples of which are illustrated in the accompanying drawings.

Figure 1:
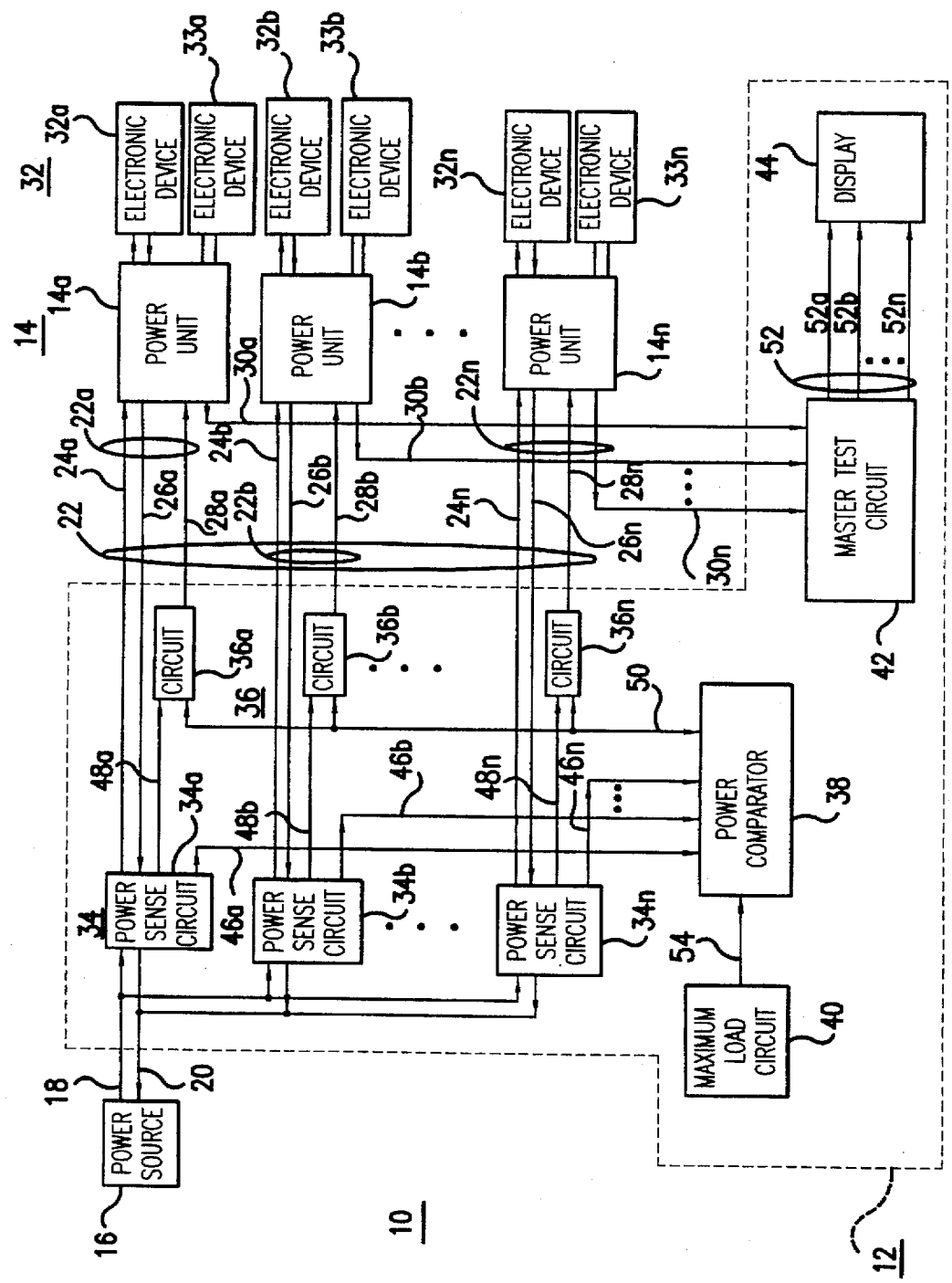
FIG. 1 is an illustration of a load distribution and management system (LDMS) according to a present preferred embodiment of the invention.

The exemplary embodiment of the load distribution and management system of the present invention is shown in FIG. 1 and is designated generally by the reference numeral 10 and includes a power distribution circuit and at least one power units.

As embodied herein and referring to FIG. 1 load distribution and management system (LDMS) 10 includes a power distribution circuit 12, power units 14, and electronic devices 32.

The power distribution circuit 10 connects to a power source 16 via two lines, a power line 18 and a power return 20. Power return line 20 acts as a ground to complete circuit through the system. The power distribution circuit 10 also connects to power units 14 via a set of lines 22. Power units 14 includes at least one power unit 14a. Any other number of power units 14 may be connected and are denoted by 14b through 14n, where n represents a total number of power units 14. The set of lines 22 includes a set of lines 22a that connect to power unit 14a, a set of lines 22b that connect to power unit 14b, through a set of lines 22n that connect to power unit 14n. The actual number of power units would depend on the particular application.

The set of lines 22 includes four lines for each power unit 14a, . . . 14n. Set of lines 22 includes power lines 24a, . . . 24n, power return lines 26a, . . . 26n, a power available line 28a, . . . 28n, and fault lines 30a, . . . 30n. One skilled in the art would recognize that other combinations of lines would accomplish the same result. For example, power available lines and faults lines could be implemented with a single lines for each power unit withi minor, obvious changes to the design. Power lines 24a, . . . 24n, and power available lines 28a, . . . 28n are outputs of the power distribution circuit 12 and power return lines 26a, . . . 26n and fault lines 30a, . . . 30n are outputs of power units 14a, . . . 14n, respectively.

Each of power units 14a, . . . 14n provide power, respectively, to electronic devices 32a, . . . 32n and 33a, . . . 33n respectively. Each additional power unit provides another location for an electronic device connection. Furthermore, a preferred embodiment of the present invention includes more than two electronic devices attched to each power unit. The number of electronic devices attached to each power unit 14 is a matter of simple design choice.

The power distribution circuit 12 receives power from power source 16 and distributes the power to the power units 14. For the sake of simplicity, the load distribution and management system 10 is being described with three power units, however, any arbitrary number of units is envisioned. Power distribution circuit 12 has four major functions: (1) monitoring the amount of power drawn by the power units 14; (2) determining whether additional power is available and so indicating; (3) determining and indicating system status; and (4) prevents power units from drawing additional power until additional power is available.

Power source 16 may be any suitable well known source of power including alternating current (AC) and direct current (DC) power sources. For example, power source 16 may be a turbine engine of an aircraft, one or more batteries, or power drawn from a locomotive engine. Other preferred power sources include portable or stationary power generator sources. The particular choice of power source 16 is a design choice. Any power source effective to supply power that can be measured lies within the scope of the invention. Typically, for an aircraft, the total power generally ranges from about 100 Watts to about 100,000 Watts.

Power units 14 provide the power received from power distribution circuit 12 to electronic devices 32 and 33 based on certain criteria described below.

Power distribution circuit 12 includes power sense circuits, power available circuits, a power comparator, a maximum load circuit, a master test circuit, and a display. As herein embodied and referring to FIG. 2, power distribution circuit 12 includes power sense circuits 34, power available circuits 36, power converter 38, maximum load circuit 40, master test circuit 42, and display 44.

Each of power sense circuits 34a, . . . 34n connect to power line 18 and power return line 20. Power sense circuits 34a, . . . 34n, respectively, connect power line 18 to power source lines 24a, . . . 24n, and power return line 20 to power return lines 26a, . . . 26n. Power sense circuits 34 also provide outputs to power available circuits 36 via lines 48a, . . . 48n, respectively and power comparator 38 via sense lines 46a, . . . 46n.

Power comparator 38 receives inputs from maximum load circuit 40 and power sense circuits 34 via power sense lines 46a, . . . 46n. Power comparator outputs a signal on line 50 common to each of the power available circuits 36a, . . . 36n.

Master test circuit 42 receives inputs from power units 14a, . . . 14n via fault lines 30a, . . . 30n, respectively. Display 44 connects to outputs 52a, . . . 52n of master test circuit 42.

Power sense circuits 34 measure the amount of power drawn from power lines 24 and power return lines 26 by each of the power units 14. Power sense circuits 34 may be of any type effective to measure the power drawn and the type would depend on the type of power that power source 16 generates. For example, if power source 16 generates an alternating current, then power sense circuits 34 measure current. Alternatively, if power source 16 generates a direct current, then power sense circuits 34 measure voltage.

Power sense circuit 34a measures the amount of power drawn by power unit 14a and communicates this amount to power comparator 38 via line 46a. Likewise, power sense circuit 34b measures the amount of power drawn by power unit 14b and communicates this amount to power comparator 38 via line 46b. Power sense circuit 34n operates in a similar fashion. The actual implementation of sensing power is a design choice and may be accomplished by any well known method or circuit.

Power sense circuits 34 also determine whether its respective power unit 14 exceeds a maximum power limit for each respective power unit 14. For example, if power sense circuit 34a measures that the amount of power being drawn by power unit 14a exceeds power unit 14a's maximum power limit, power sense circuit 34a generates a signal on line 48a. The maximum power limit for each power unit 14 is determined depending on the characteristics of the power unit. One preferred range is from about 2.5 Volts to about 4.5 Volts. Techniques for measuring power and determining whether the power has exceeded a limit are well known in the art. Power sense circuit 34a removes the signal from line 48a after the amount of power drawn by power unit 14a drops below a hysteresis value that is below power unit 14a's maximum power limit. The hysteresis value anticipates an expected amount of power to be drawn by electronic device 32a so that the device 32a will not cause the power drawn by power unit 14a to exceed its maximum power limit. Power sense circuits 34b, . . . 34n operate in a similar fashion. The maximum power limit for each power unit 14 may be input by a user or pre-set in a circuit.

In another preferred embodiment, more than one power unit is connected in a daisy chained manner to each power sense circuit. For example additional power units are connected to power sense unit 34a by connecting the additional power units to lines 24a, 26a, and 28a. The particular number of power units connected to each power sense circuit is a design choice.

Power comparator 38 receives the amount of power being drawn by each of the power supplies 14 and determines a total amount of power being drawn by summing each of its inputs 46a, . . . 46n. For example, power comparator 38 receives the amount of power being drawn by power unit 14a via line 46a and, likewise the amount of power being drawn by power unit 14n via line 46n. Power comparator 38 sums the values of lines 46a, . . . 46n to determine a total amount of power being drawn from power source 16 by LDMS 10. Power comparator 38 compares the total amount of power being drawn by LDMS 10 to a value input from maximum load circuit 40 on line 54. If the total amount of power becomes greater than the value on line 54, then power comparator 38 indicates that no more power is available by removing a system available signal on line 50. For power comparator to place a system available signal on line 50, indicating that power is again available, the total amount of power must fall below a hysteresis value. The hysteresis value is selected to be an amount below the value produced on line 54 by maximum load circuit 40. The hysteresis value anticipates an expected additional amount of power to be drawn by an electronic device 32 so that the expected additional draw will not cause the total power to exceed the maximum load value present on line 54. For example, if the electronic device were a computer and the computer preformed a harddrive operation, additional power would be drawn.

Maximum load circuit 40 generates a signal equal to the maximum load available for the LDMS 10. An operator inputs the maximum available load. Many well known techniques and circuits may be employed to implement maximum load circuit 40. One preferred implementation includes DIP switches connected to various resistors that are connected in parallel.

Power available circuits 36 output a power available signal on lines 28. For example, power available circuit 36a generates a power available signal on line 28a that is transmitted to power unit 14a. Power available circuits 36b, . . . 36n operate in a similar manner.

Power available circuits 36 receive signals from power sense circuits 34 and comparator 38. Power available circuits 36 only generate a power available signal for their respective power units 14 when power converter 38 indicates on line 50 that additional power is available and power sense circuits 34 indicate on lines 48 that a maximum power limit for its power unit 14 has not been exceeded. For example, power available circuit 36a determines whether to generate a power available signal on line 28a by examining lines 48a from power sense circuit 34a and line 50 from comparator 38. If power sense circuit 34a indicates that a maximum power unit is not exceeded and power comparator 38 indicates that additional power is available, power available circuit 36a generates a power available signal on line 28a. If either power sense circuit 34a indicates that its maximum power limit for power unit 14a has been exceeded or power comparator 38 removes the additional power available signal from line 50, power available circuit 36a removes the power available signal from line 28a. Each of the other power available circuits 36b, . . . 36n operate in a similar fashion.

Master test circuit 42 receives indications of the fault status of each of the power units 34 via fault lines 30. For example, master test circuit 42 receives the fault status of power unit 14a, . . . 14n via lines 30a, . . . 30n. Master test circuit 42 uses outputs 52a, . . . 52n to operate display 44 for indicating the status of each of the power units 14a, . . . 14n. If additional power units 14 were included, a additional signal line 52 would be required for each additional associated power sense circuit 36. Master test circuit 42 may be implemented in a variety of ways. One preferred implementation includes latching circuitry to latch the values of the fault lines 30 and driver circuitry to operate display 44.

Display 44 may be any type of display effective to display whether a particular power unit 14 is in a fault condition or not. For example, one preferred implementation includes a bank of light emitting diodes (LEDS). Each power unit 14a, . . . 14n has a corresponding pair of LEDS, each of the pair being a different color. For example, one of each pair could be green to indicate a no fault condition and the other red to indicate a fault condition.

Each of the power units 14a, . . . 14n are substantially similar in operation and function. For the sake of simplicity, the following description relates to the structure and function of power unit 14a. The following description applies equally to any of the power units 14a, . . . 14n.

Figure 2:
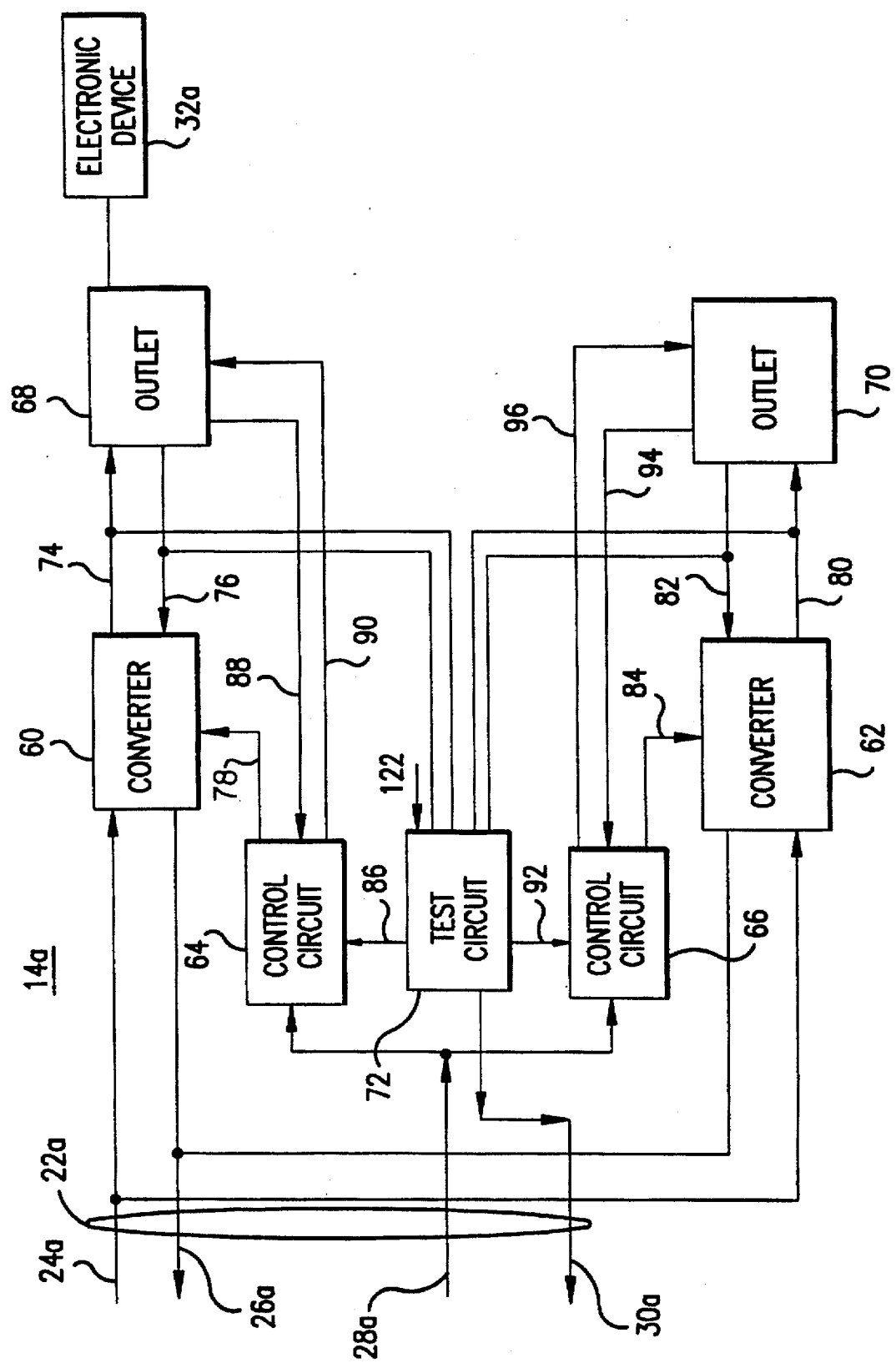
FIG. 2 is an illustration of one power unit of FIG. 1 according to the present invention.

Power unit 14a includes a pair of converters, a pair of control circuits, a pair of outlets, and a test circuit. As herein embodied and referring to FIG. 2, power unit 14a, includes converter 60, converter 62, control circuit 64, control circuit 66, outlet 68, outlet 70, and test circuit 72. Like or similar parts are identified throughout the drawings by the same reference characters. Although FIG. 2 illustrates a power unit 14a having two electronic devices 32a and 33a, it is envisioned that any number of devices could be provided by a power unit such as power unit 14a. To include more than two electronic devices would simply require duplicating the elements of a converter, outlet, and control circuit for each additional outlet as required for each additional electronic device.

Converter 60 connects to power line 24a and power return line 26a. Converter 60 also connects to outlet 68 via line power line 74 and return power line 76 and to control circuit 64 via enable line 78. Converter 62 connects to power line 24a and power return line 26a. Converter 62 also connects to outlet 70 via line power line 80 and return power line 82 and to control circuit 66 via enable line 84.

Control circuit 64 connects to power available line 28a, converter 60, test circuit 72 via test line 86, and outlet 68 via power request line 88 and power available line 90. Control circuit 66 connects to power available line 28a, converter 62, test circuit 72 via test line 92, and outlet 70 via power request line 94 and power available line 96.

Converter 60 converts the power present on power line 26a and power return line 28a into a form usable by electronic device 32a. For example, power may be supplied on power line 26a and power return line 28a in AC but electronic device 32a operates on DC current. In this case, converter 60 converts the AC power into DC power. In a preferred embodiment, converter 60 converts 115 Volt-AC into 12 Volt-DC current. The particular type of conversion depends upon the application and all types are equally preferred, including DC to DC and DC to AC for any chosen voltage or current operating range. Such modifications would be obvious to one skilled in the art. Converter 60 may be implemented by any well known technique or method for converting one power type to another. Preferred ranges of conversion on power line 74 and return power line 76 include from about 3 Volts to about 115 Volts in either AC or DC.

Alternatively, converter 60 may contain a plurality of selectable sub-converters, each of which converts the power input to a respective different power output, the selection of which is determined by the system. For example, converter 60 could include a converter to 12 Volt-DC and a converter to 212 Volt-AC. Switches could be provided on outlet 68 to select the desired converter.

Figure 3:
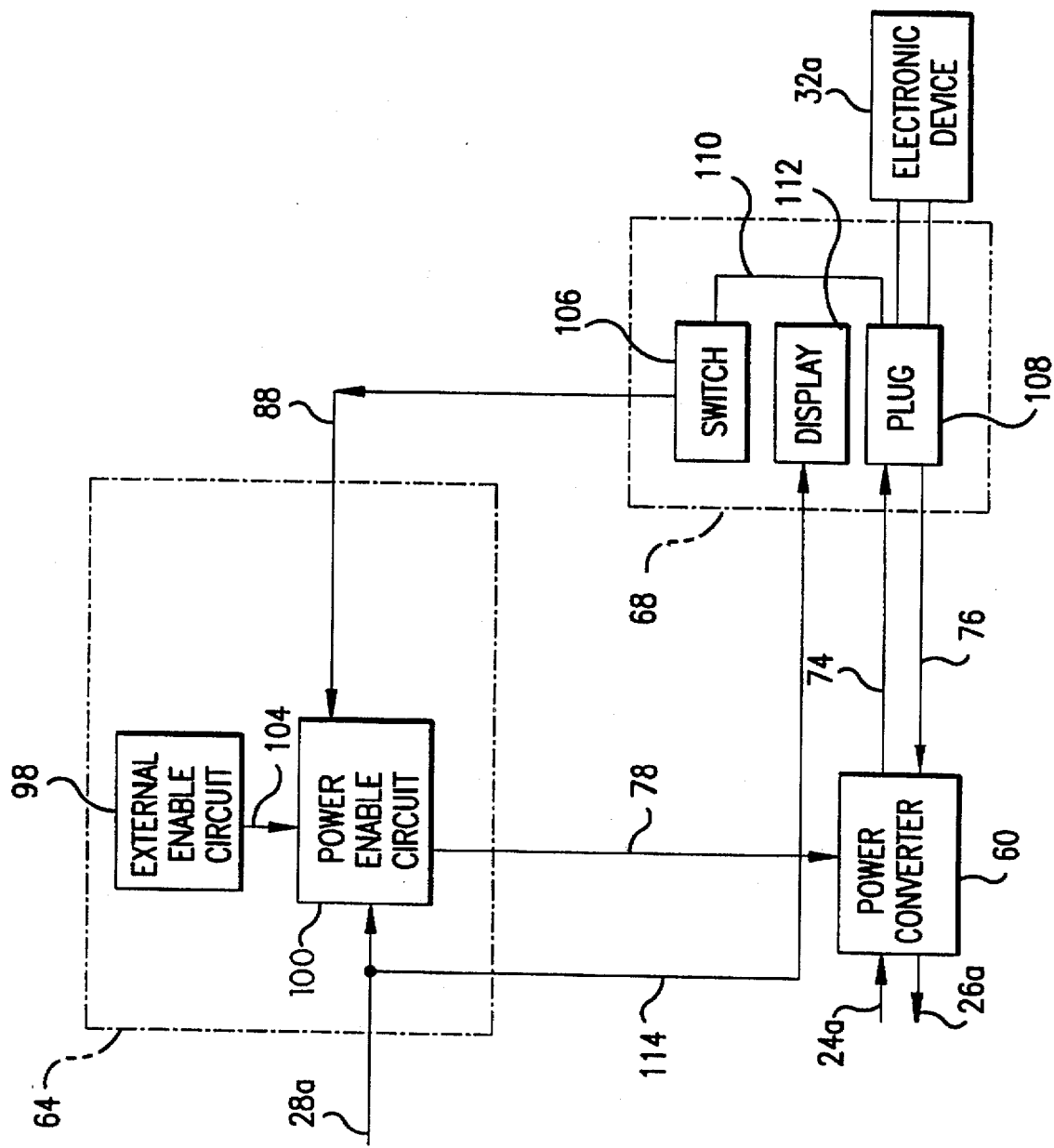
FIG. 3 is a more detailed illustration of several components of the power unit in FIG. 2.
Figure 5A:
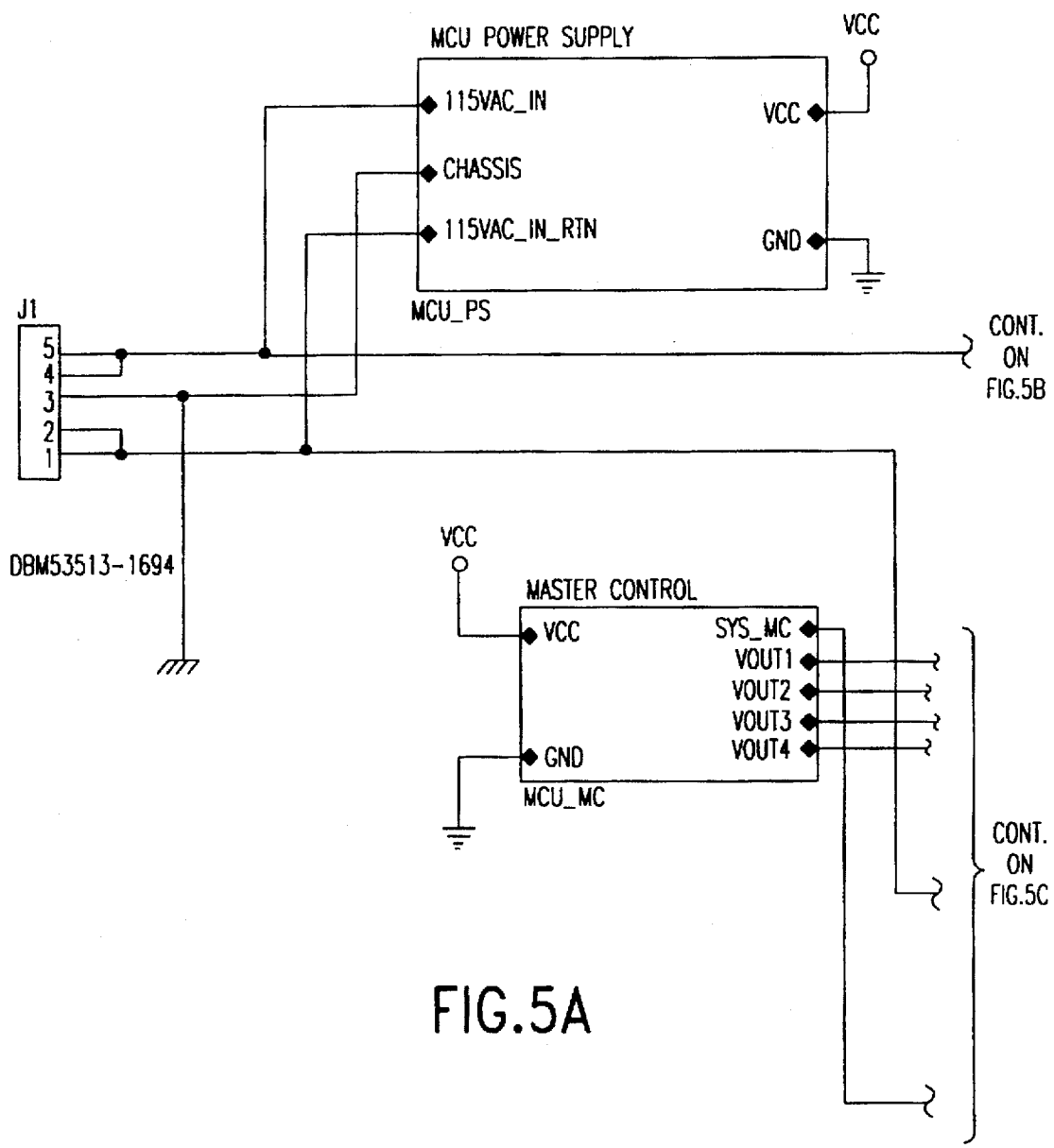
FIG. 5 is a schematic diagram of an LDMS of FIG. 1.
Figure 5B:
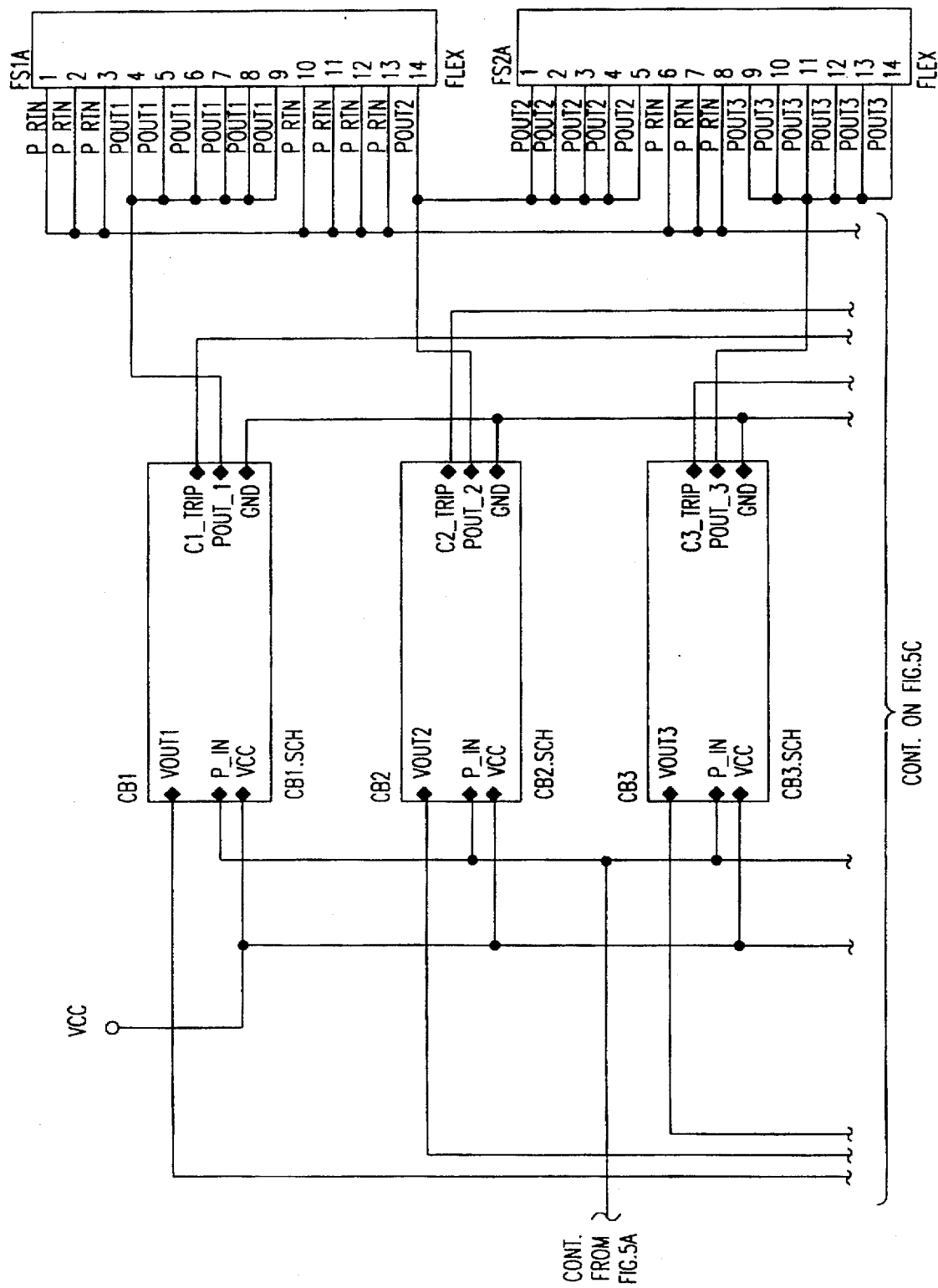
Figure 5C:
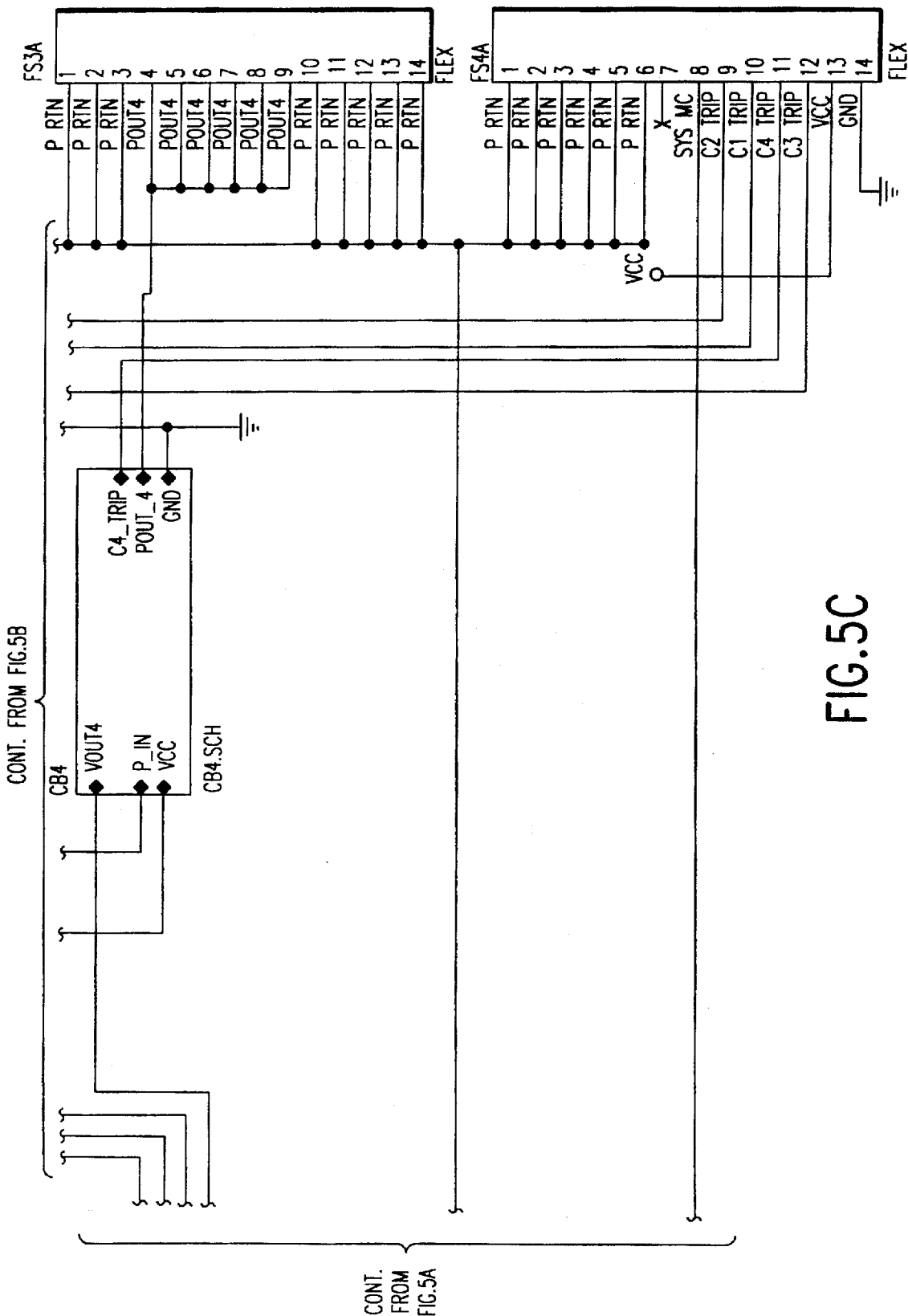
Figure 6A:
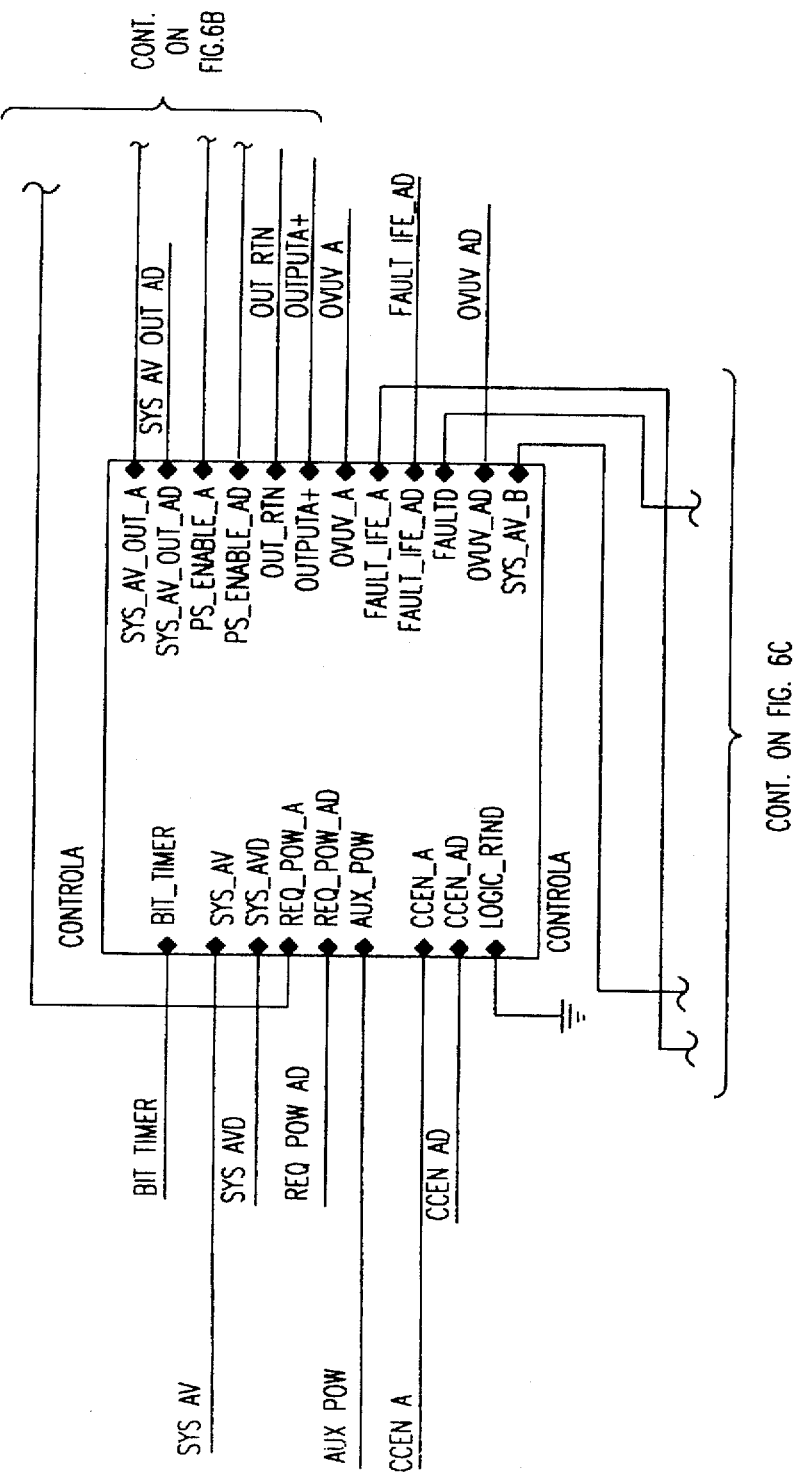
FIG. 6 is a schematic diagram of a power unit according to the present invention.
Figure 6B:
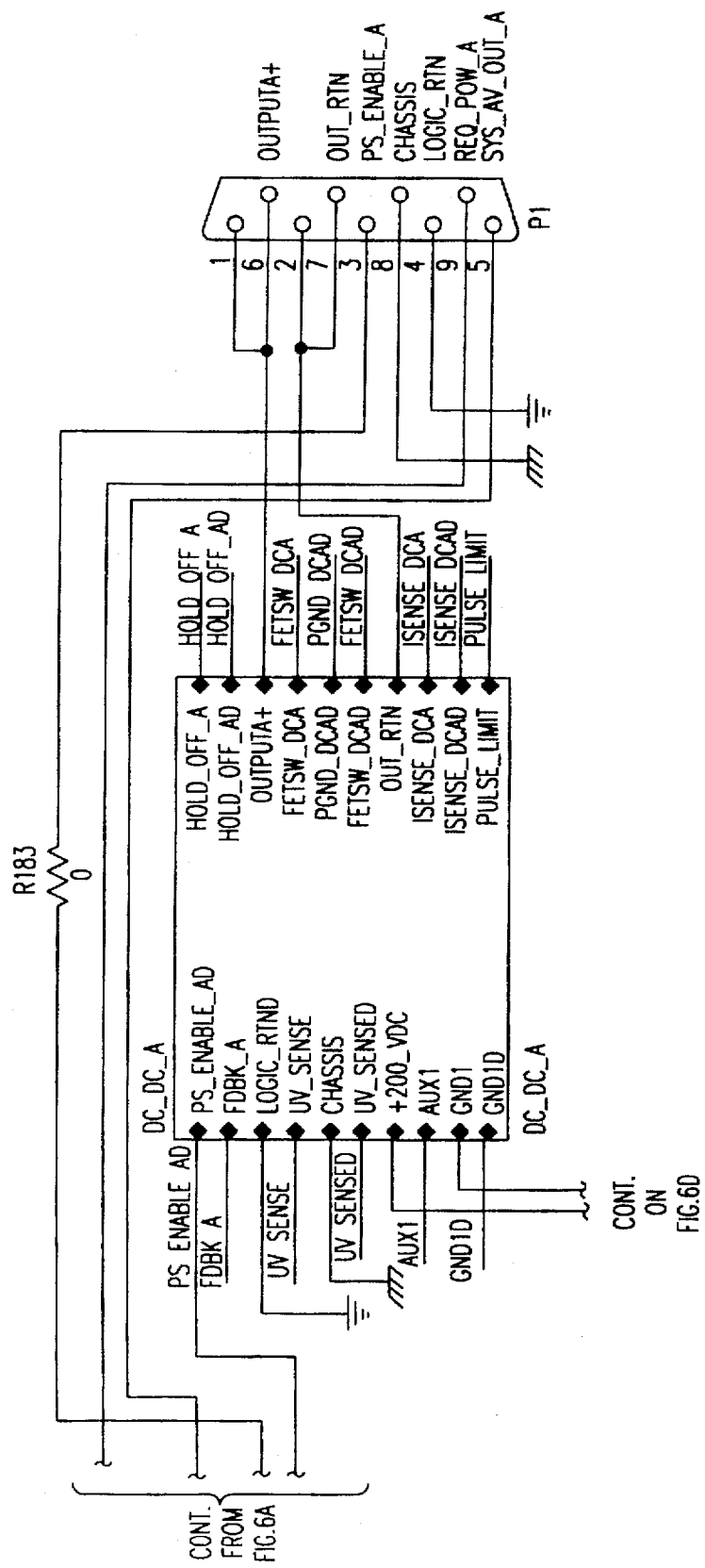
Figure 6C:
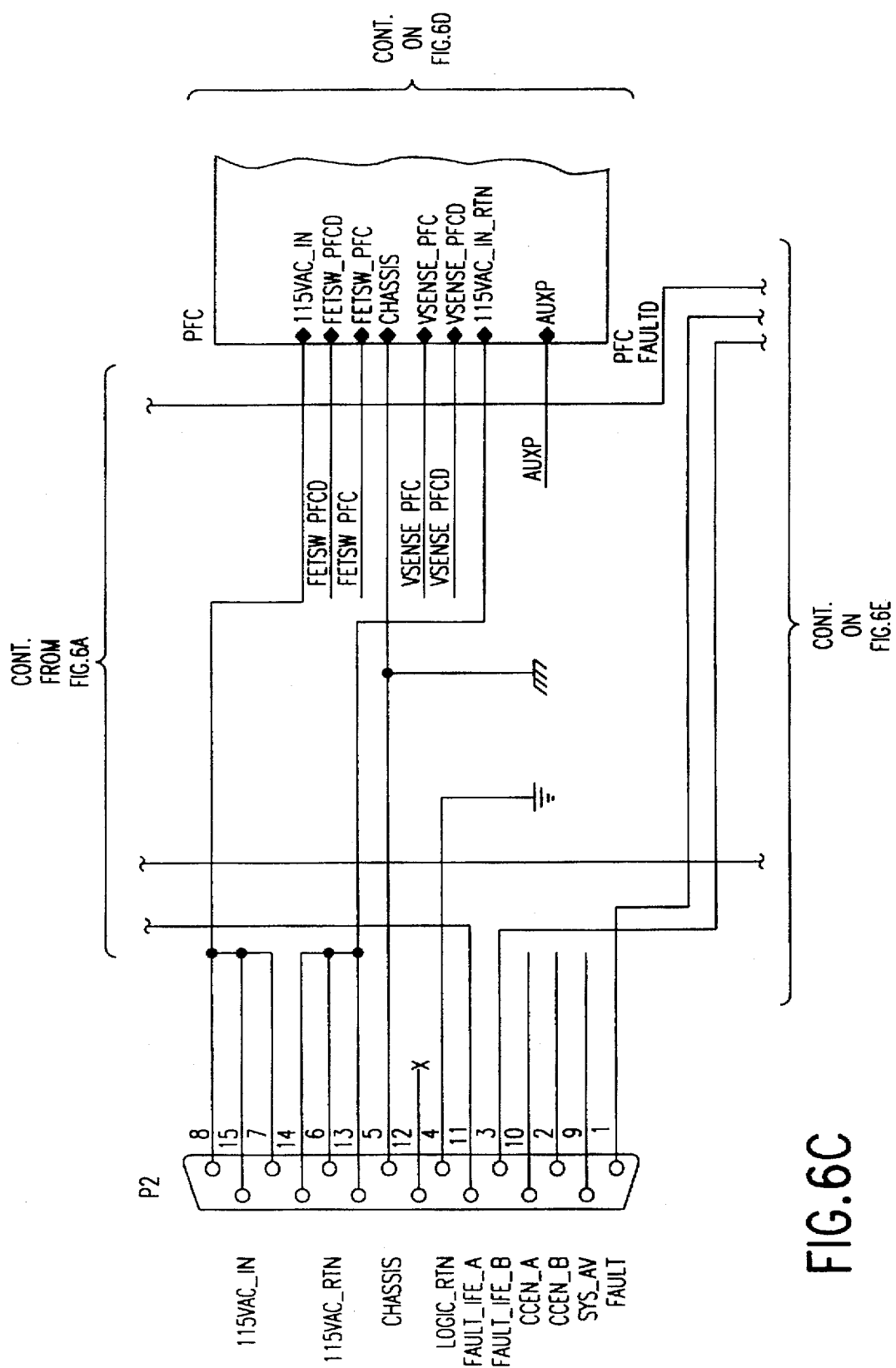
Figure 6D:
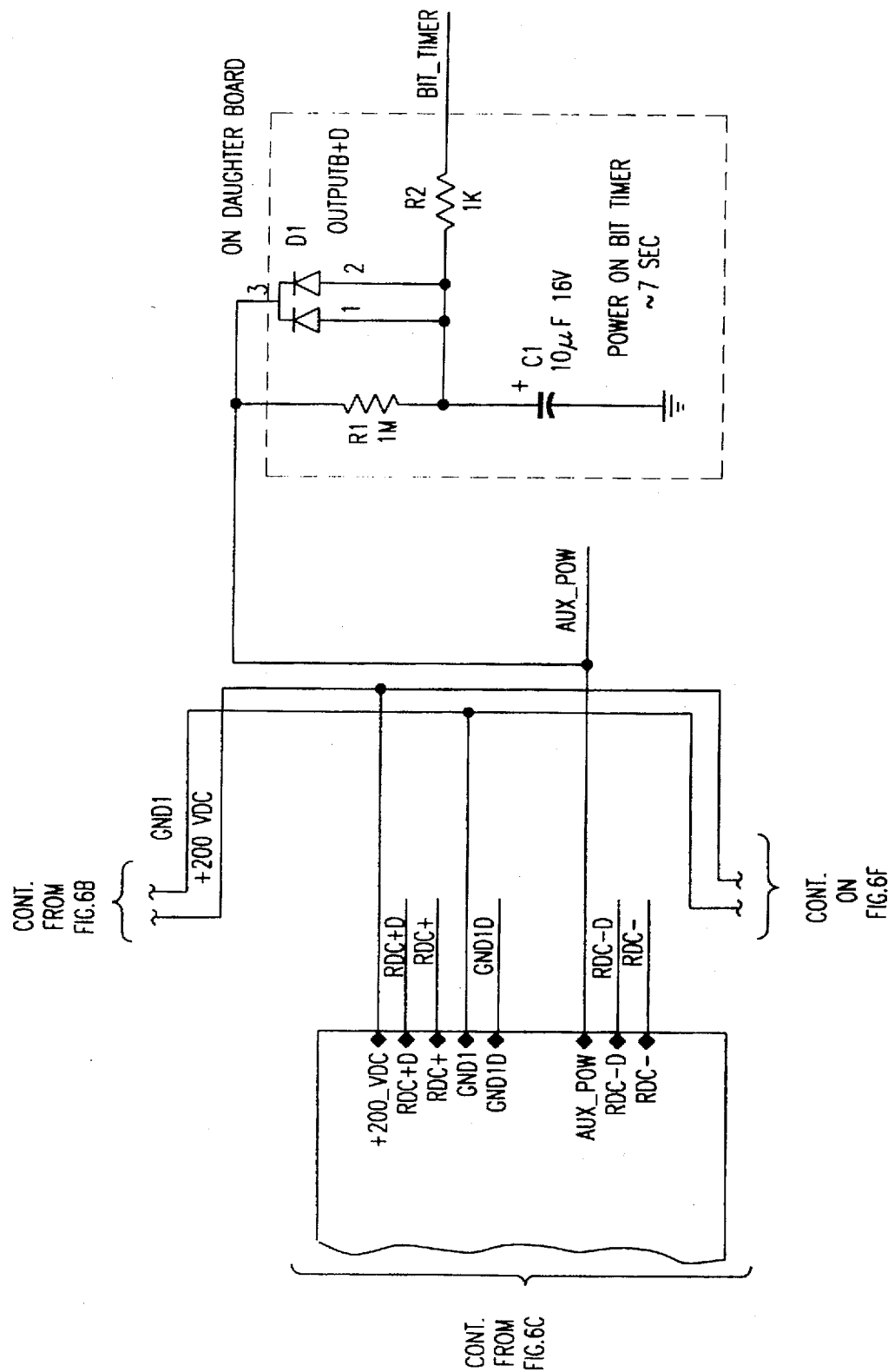
Figure 6E:
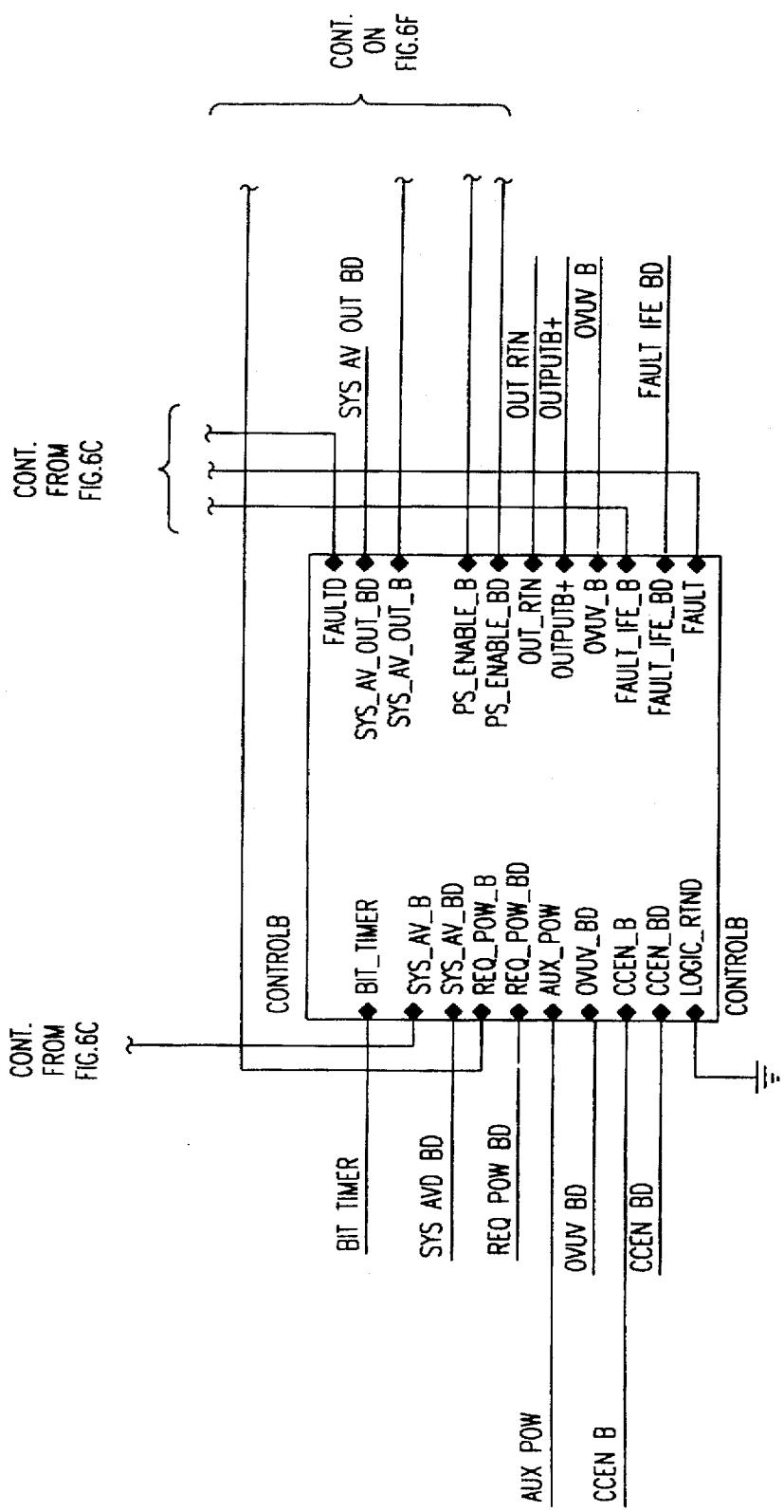
Figure 6F:
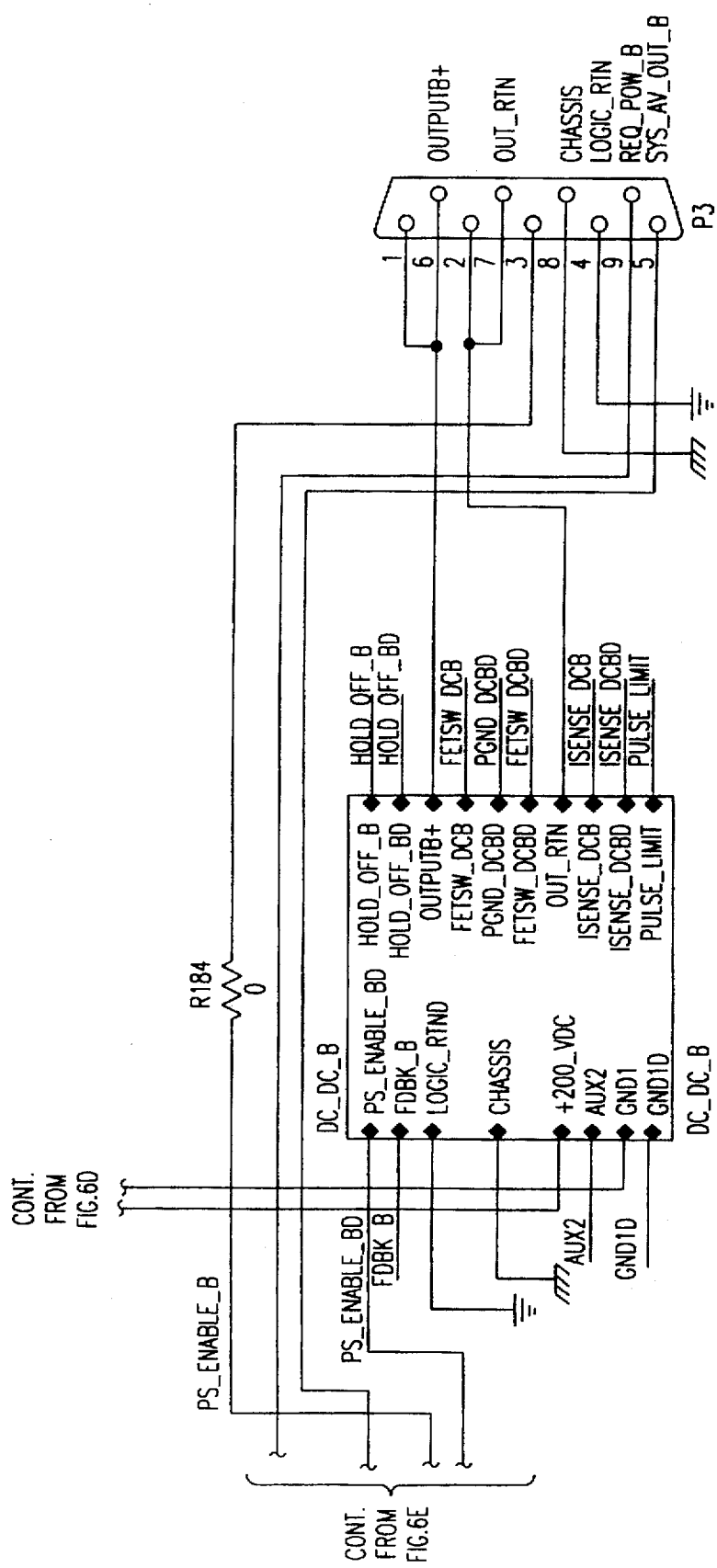
Figure 6G:
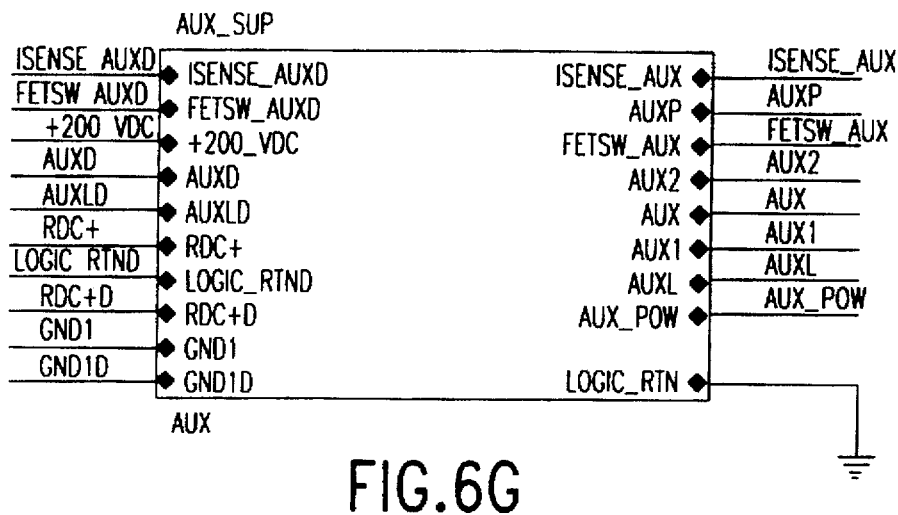
Figure 6H:
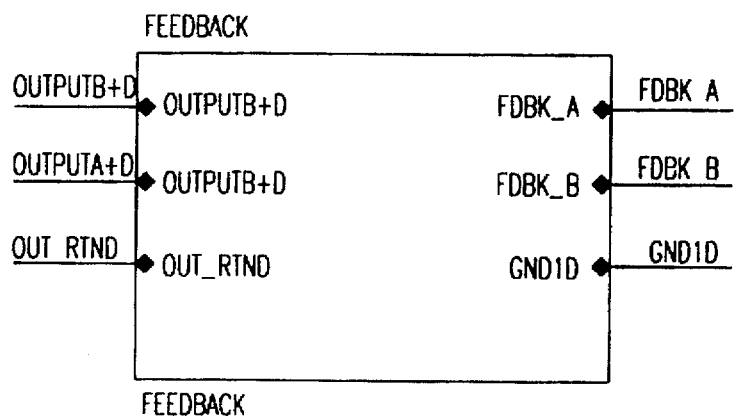
Figure 7A:
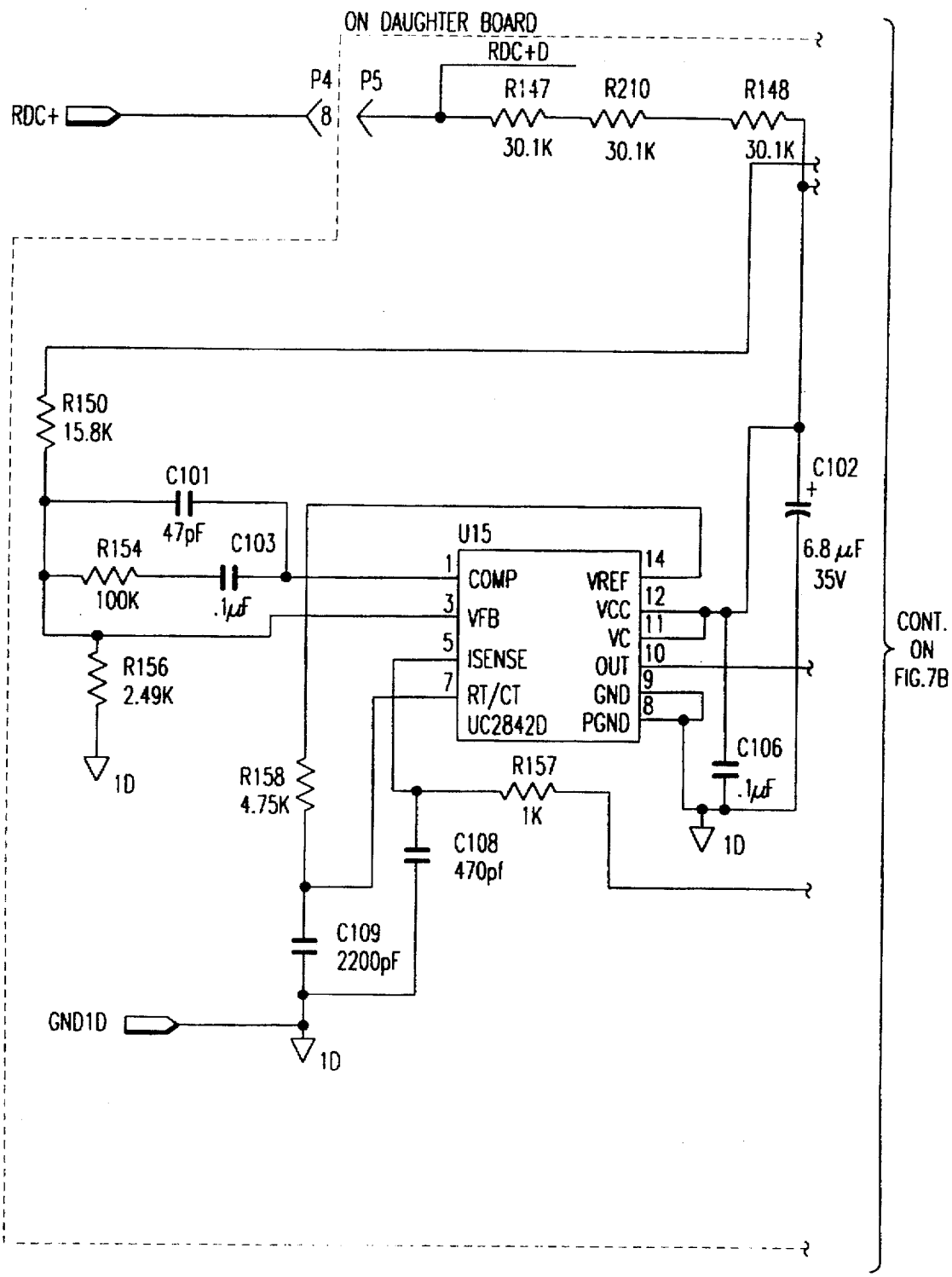
FIG. 7 is a schematic diagram of an auxiliary power supply according to the present invention.
Figure 7B:
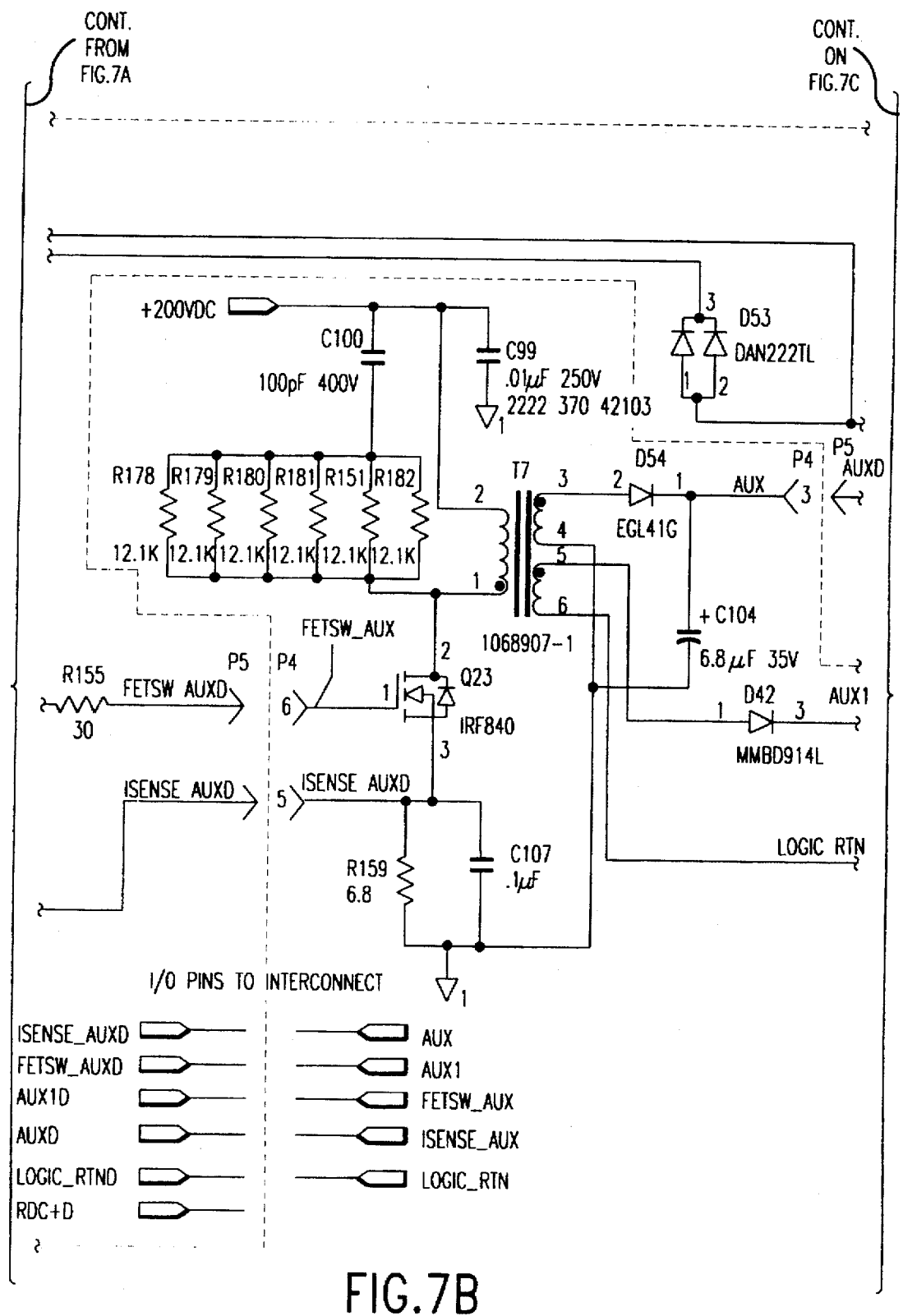
Figure 7C:
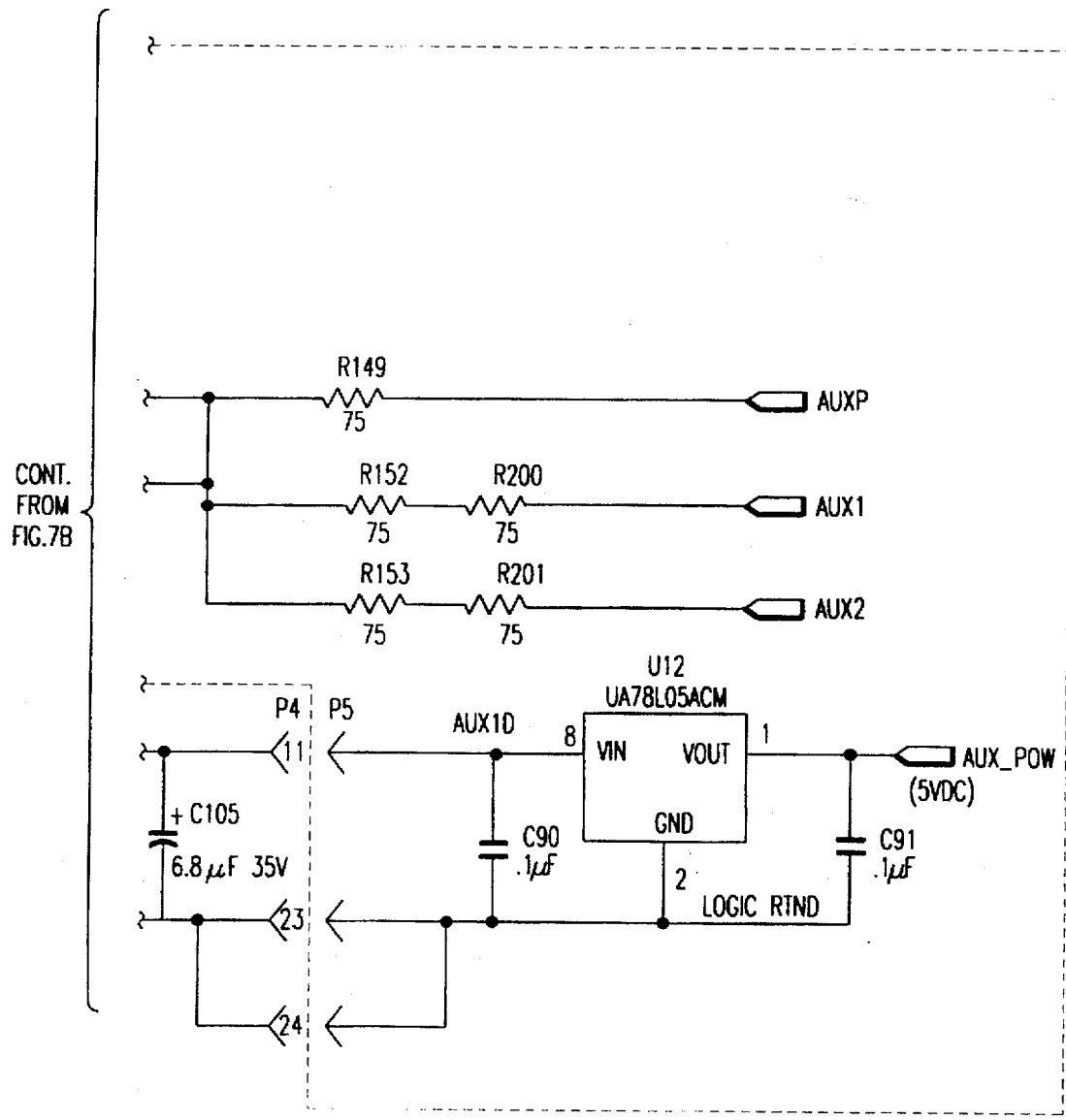
Figure 8A:
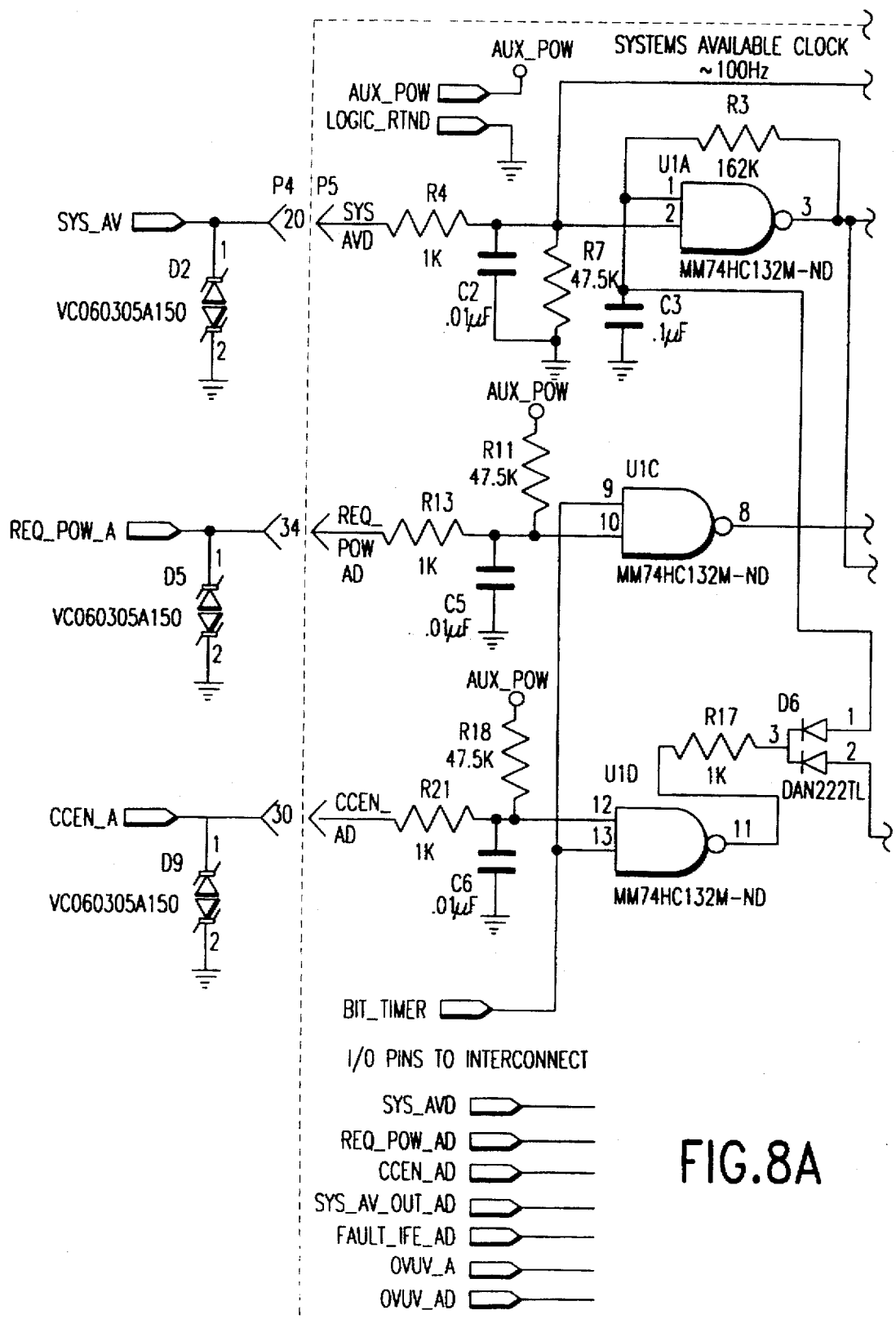
FIG. 8 is a schematic diagram of a control circuit of FIG. 2.
Figure 8B:
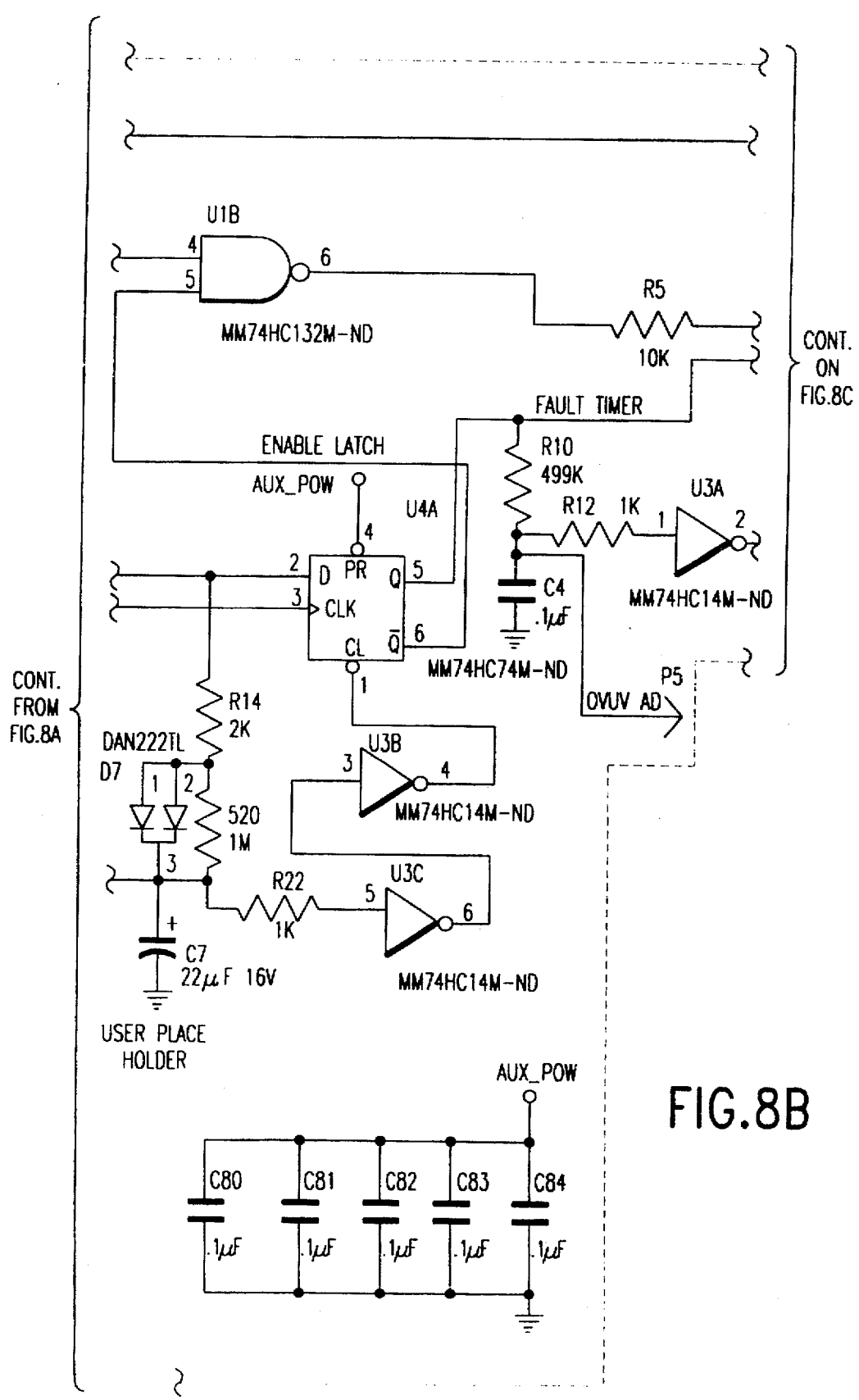
Figure 8C:
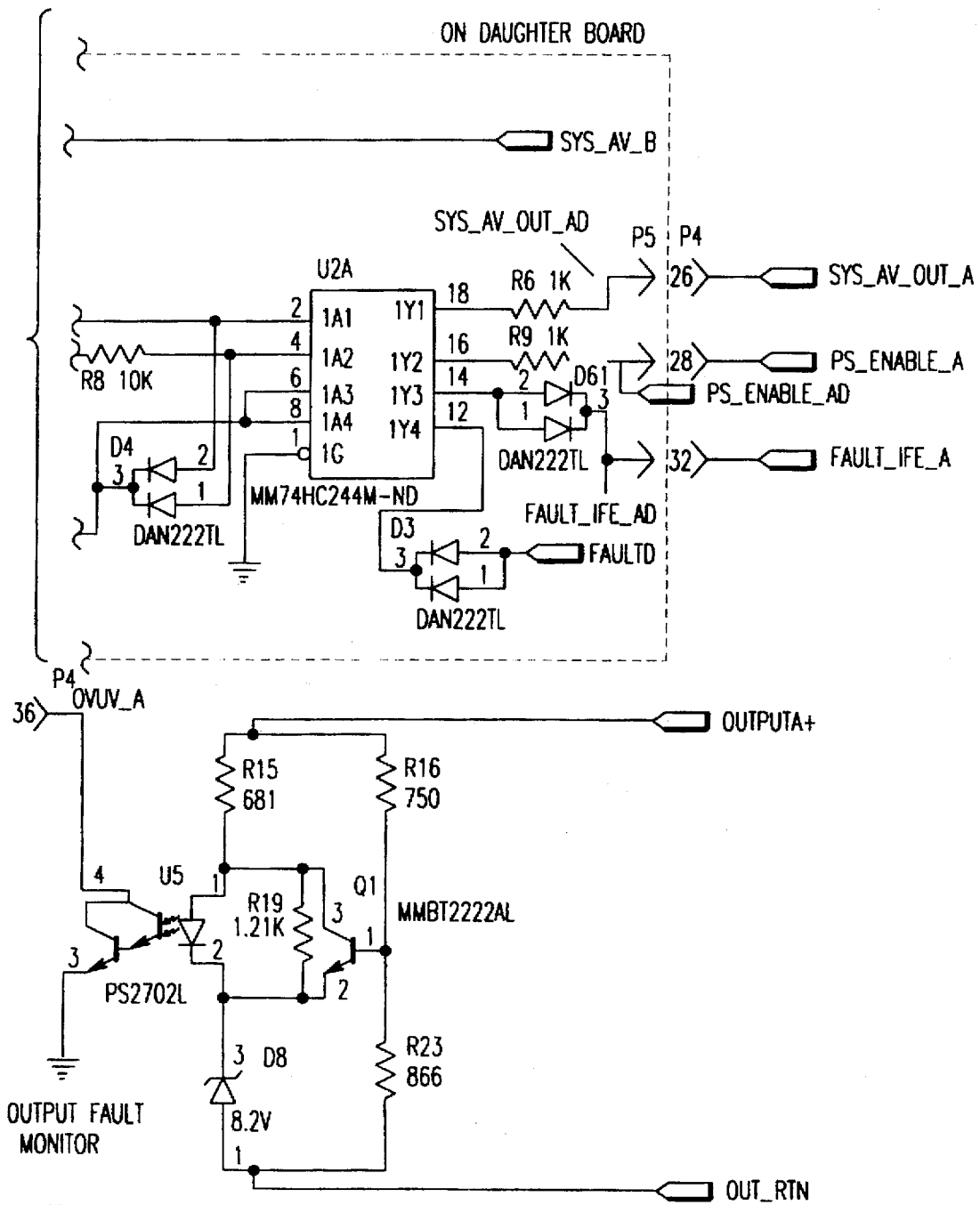
Figure 9A:
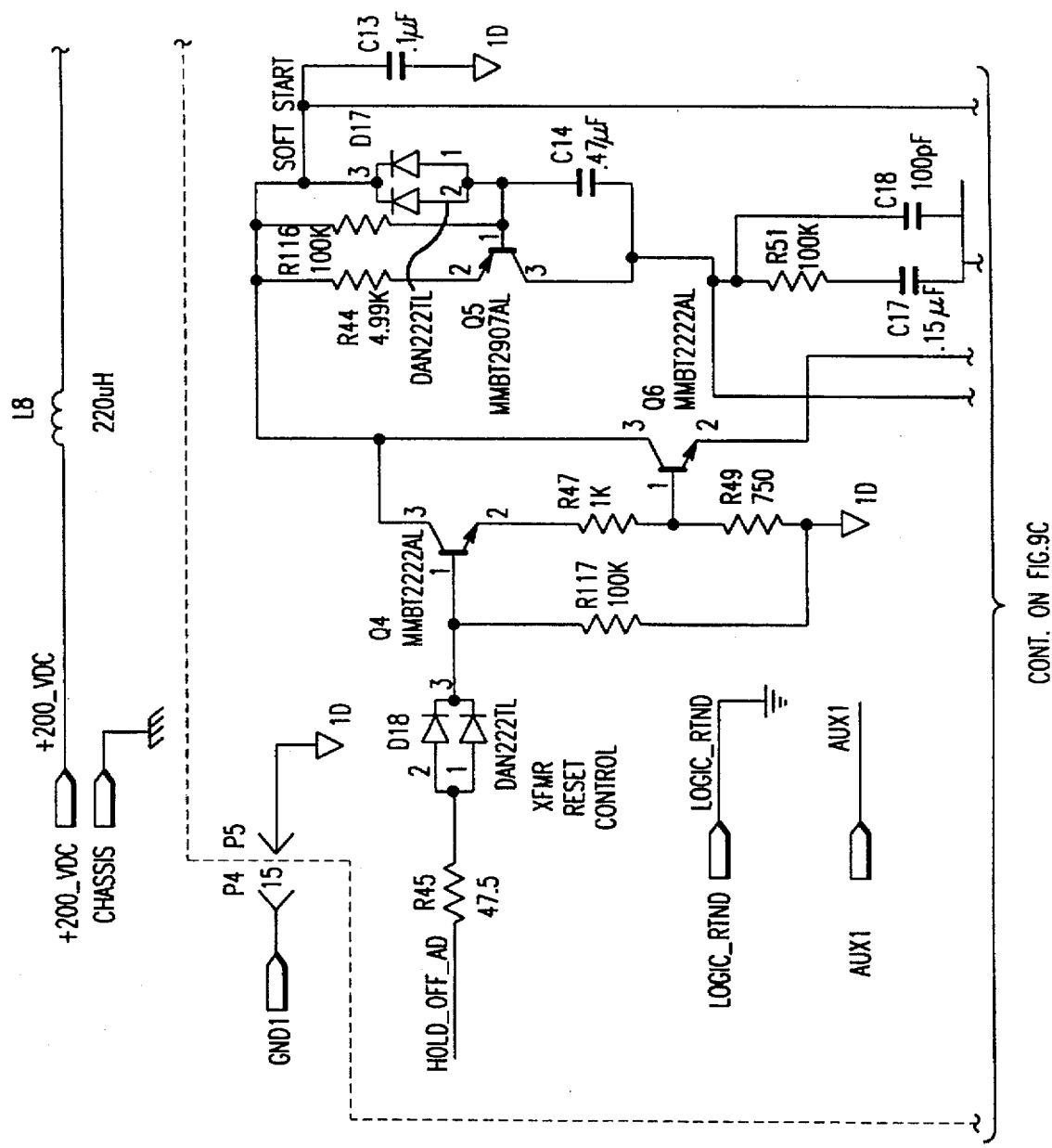
FIG. 9 is a schematic diagram of a DC-to-DC converter according of FIG. 4.
Figure 9B:
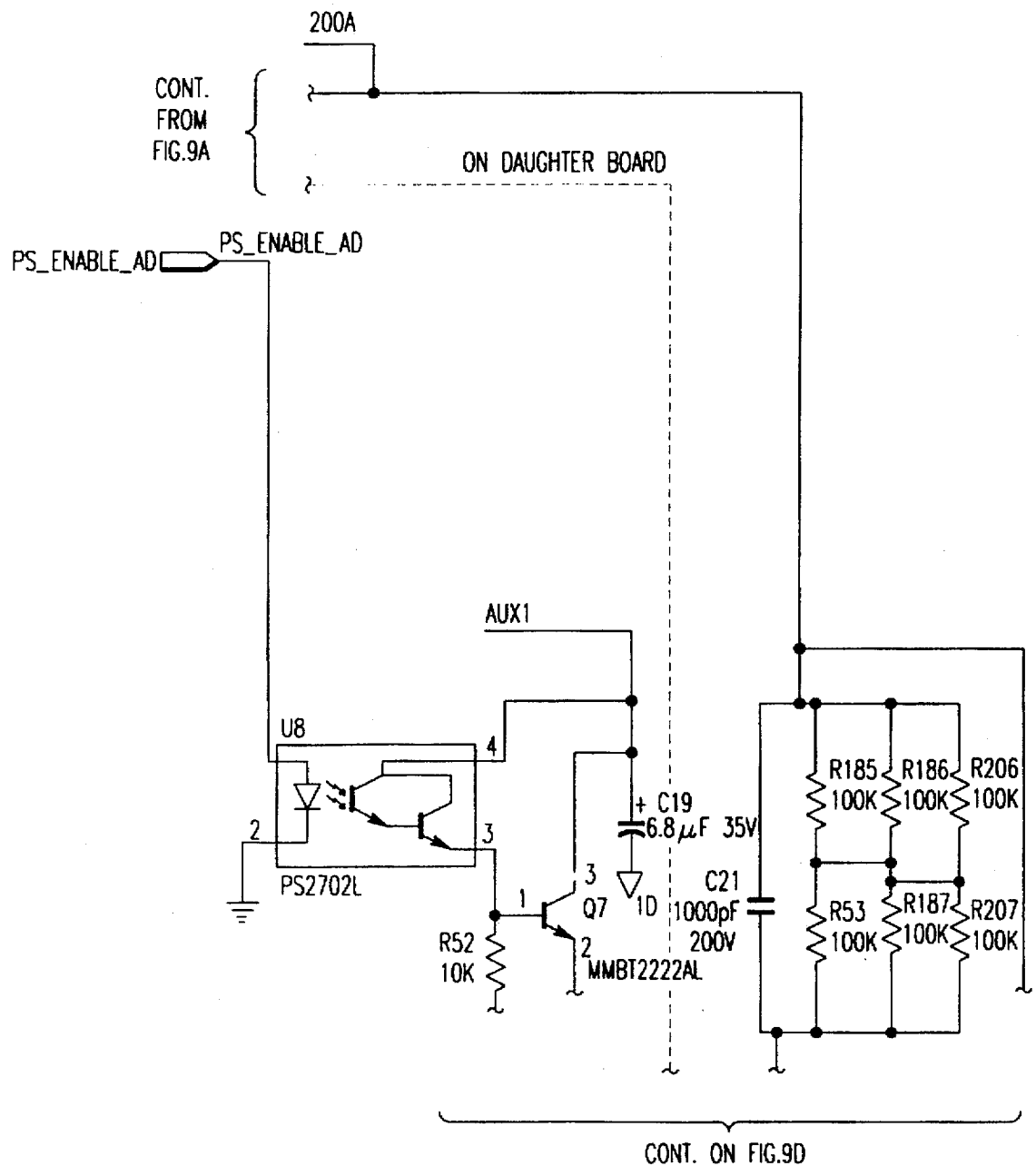
Figure 9C:
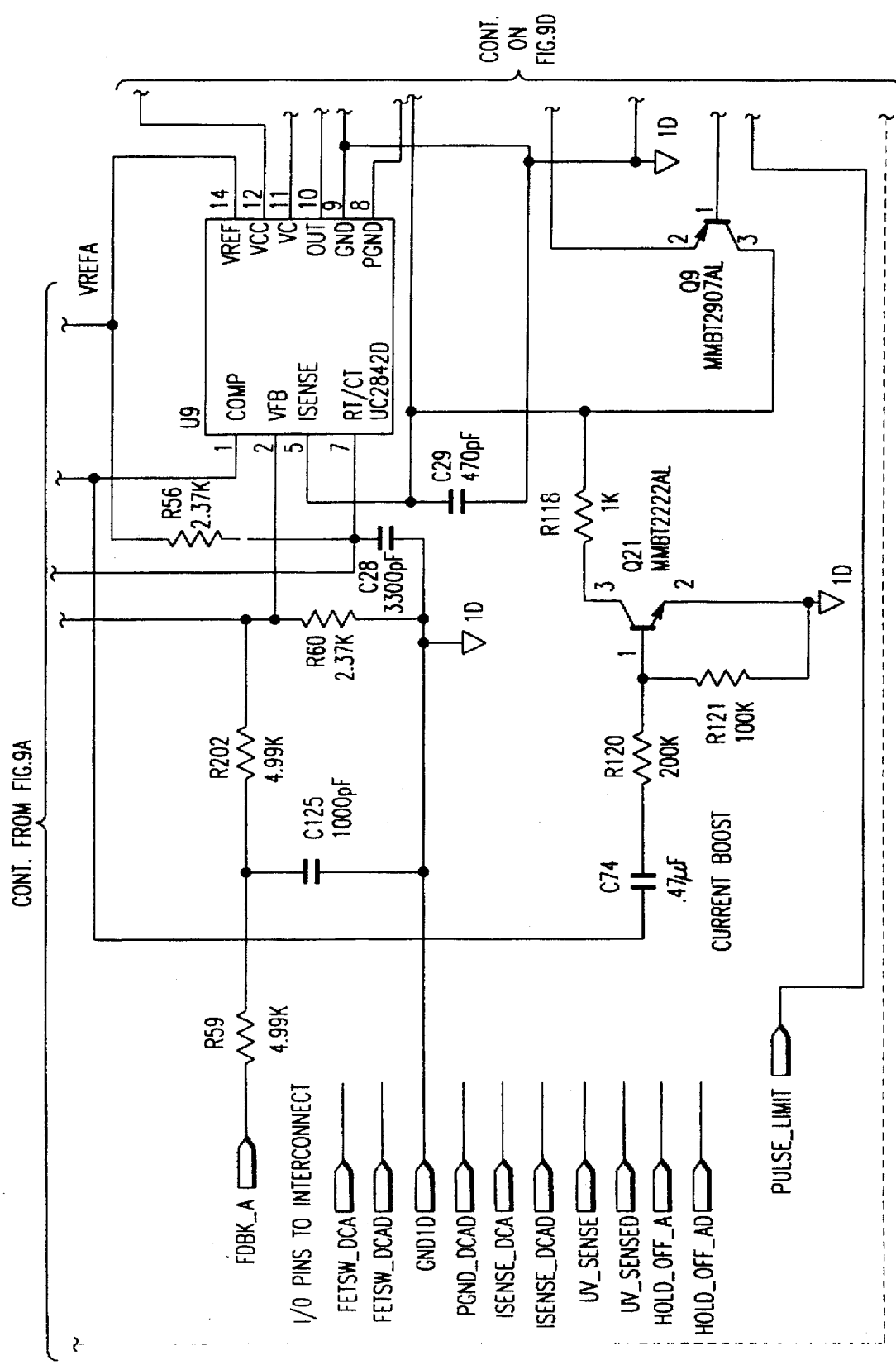
Figure 9D:
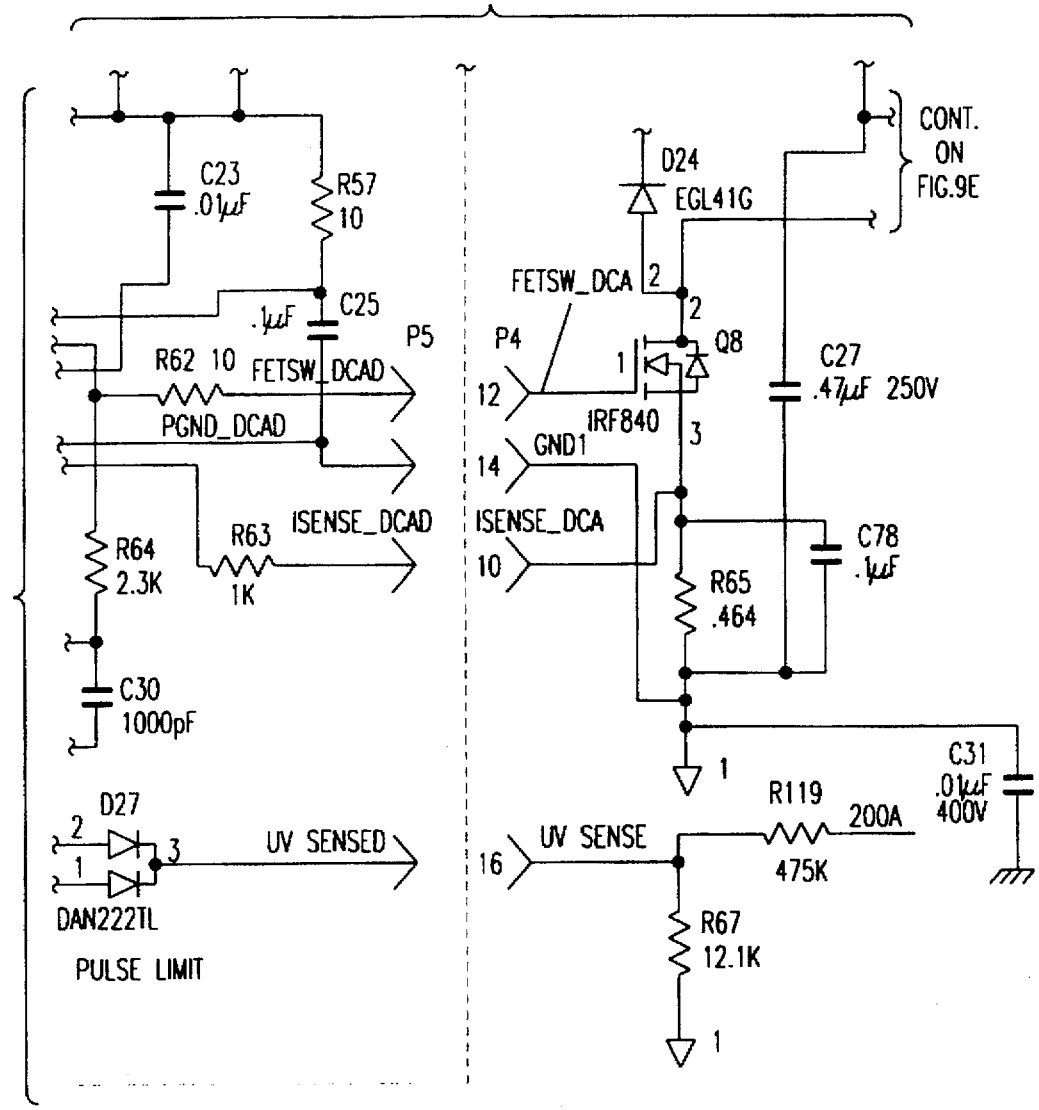
Figure 9E:
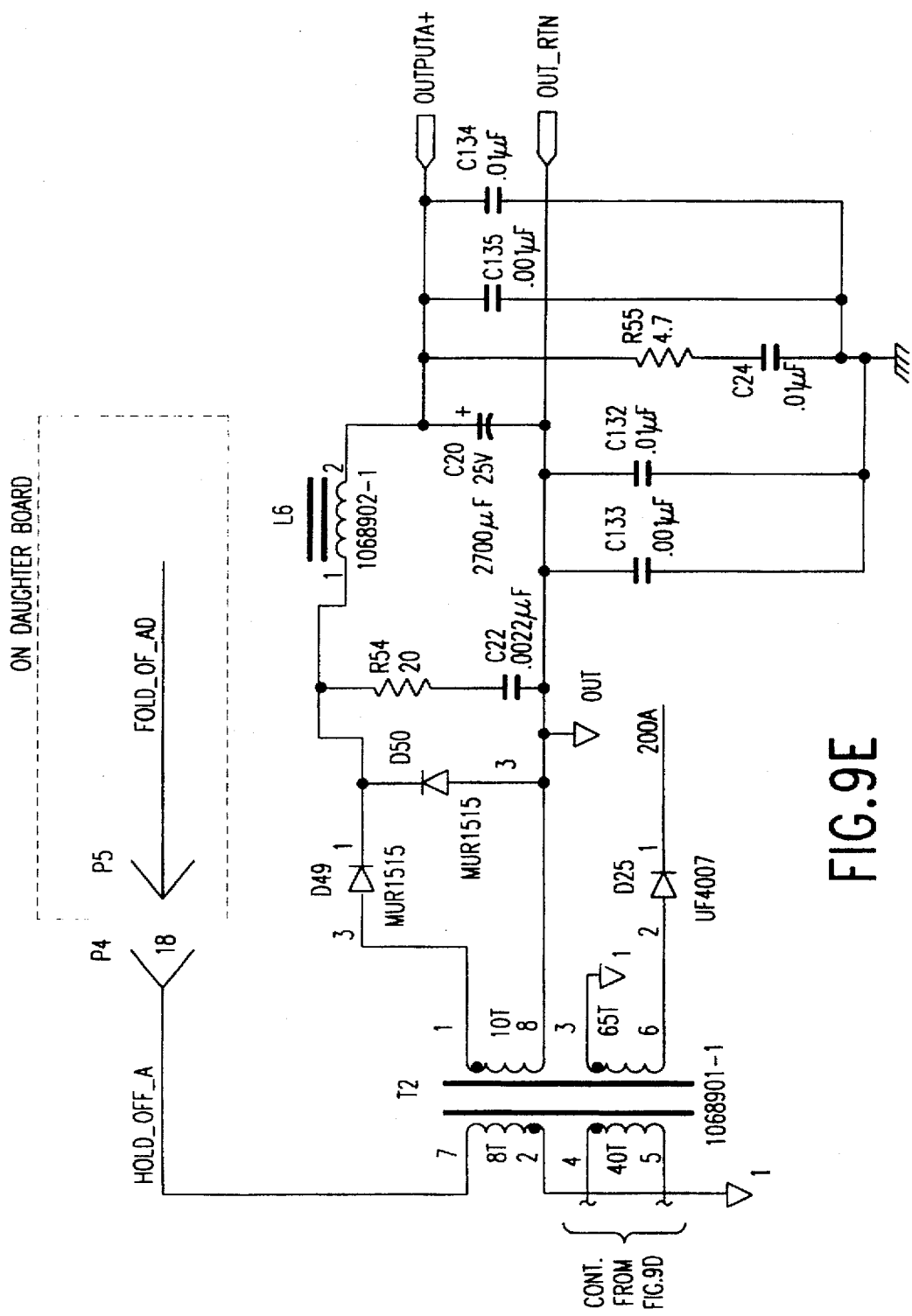
Figure 10A:
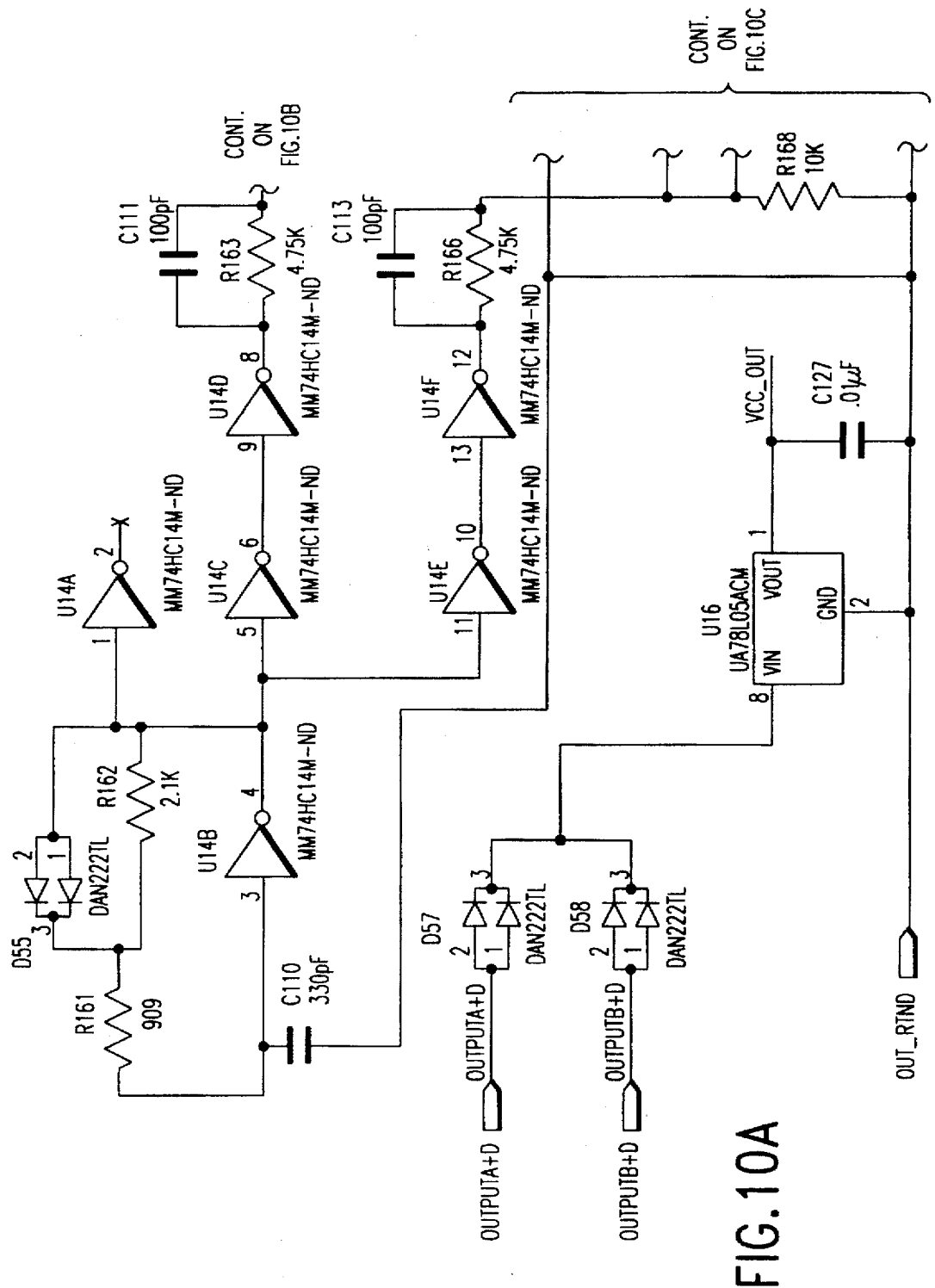
FIG. 10 is a schematic diagram of a feedback control unit according to the present invention.
Figure 10B:
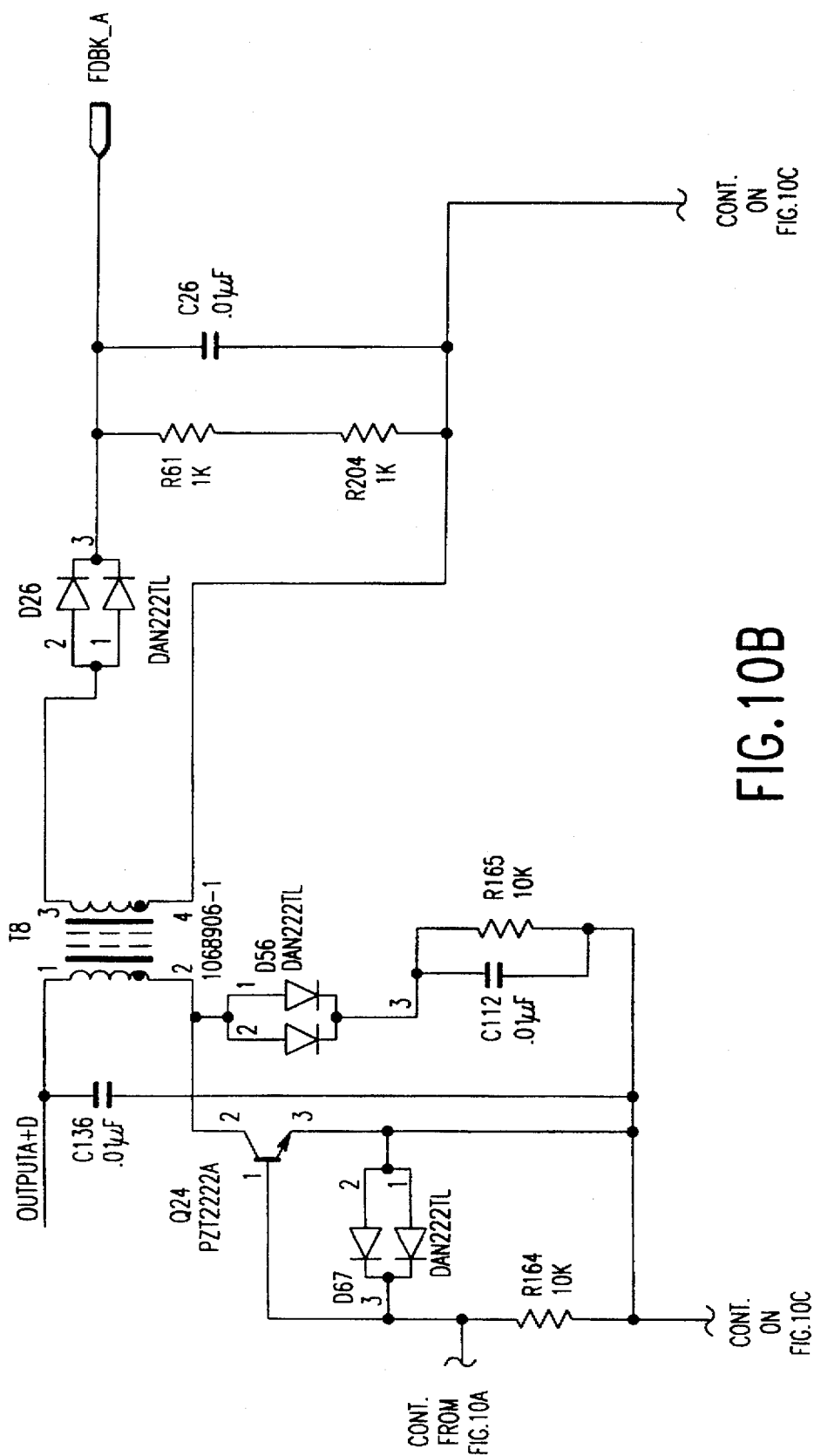
Figure 10C:
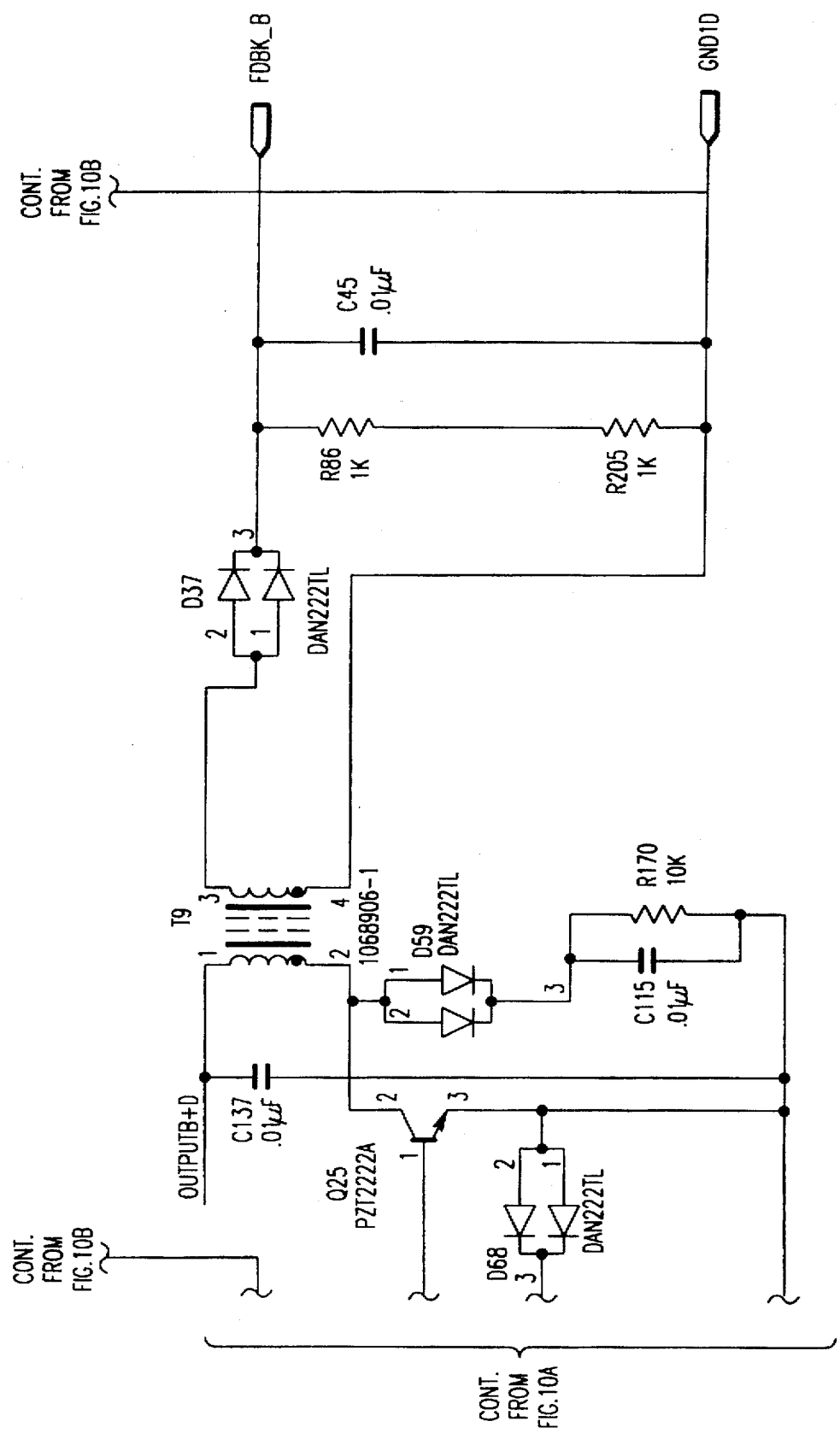
Figure 11A:
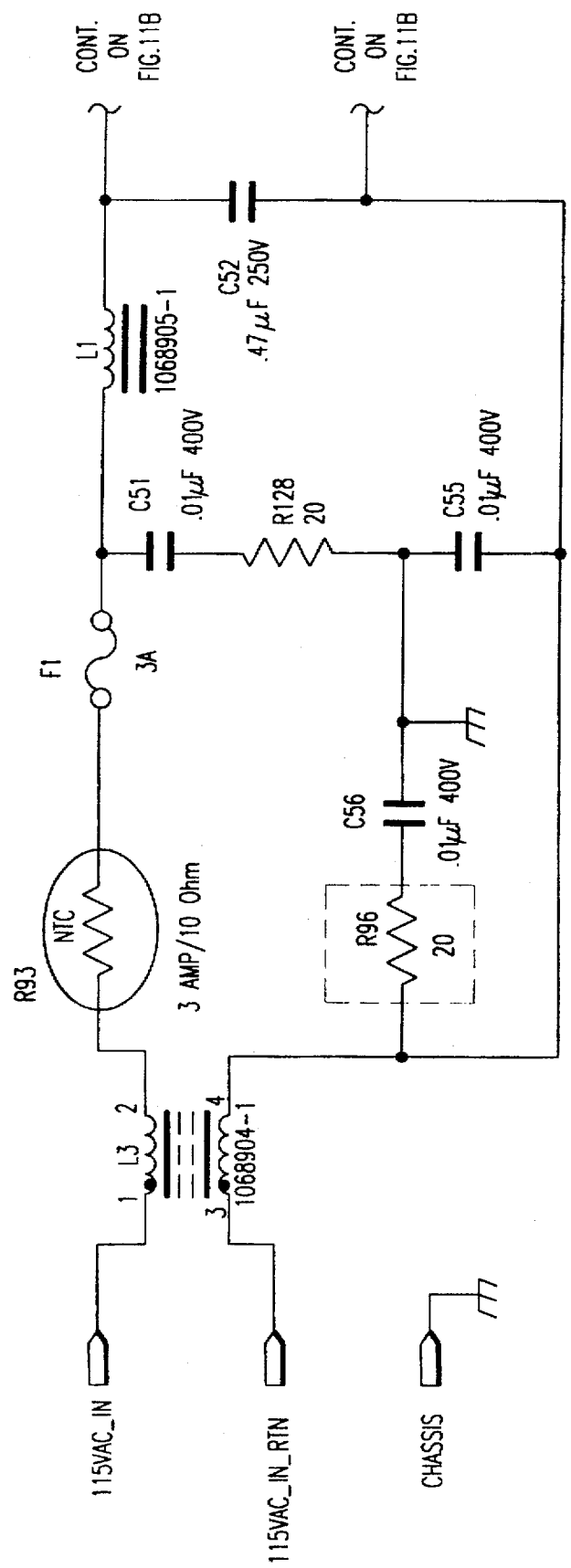
FIG. 11 is a schematic diagram of a power factor correction circuit of FIG. 4.
Figure 11B:
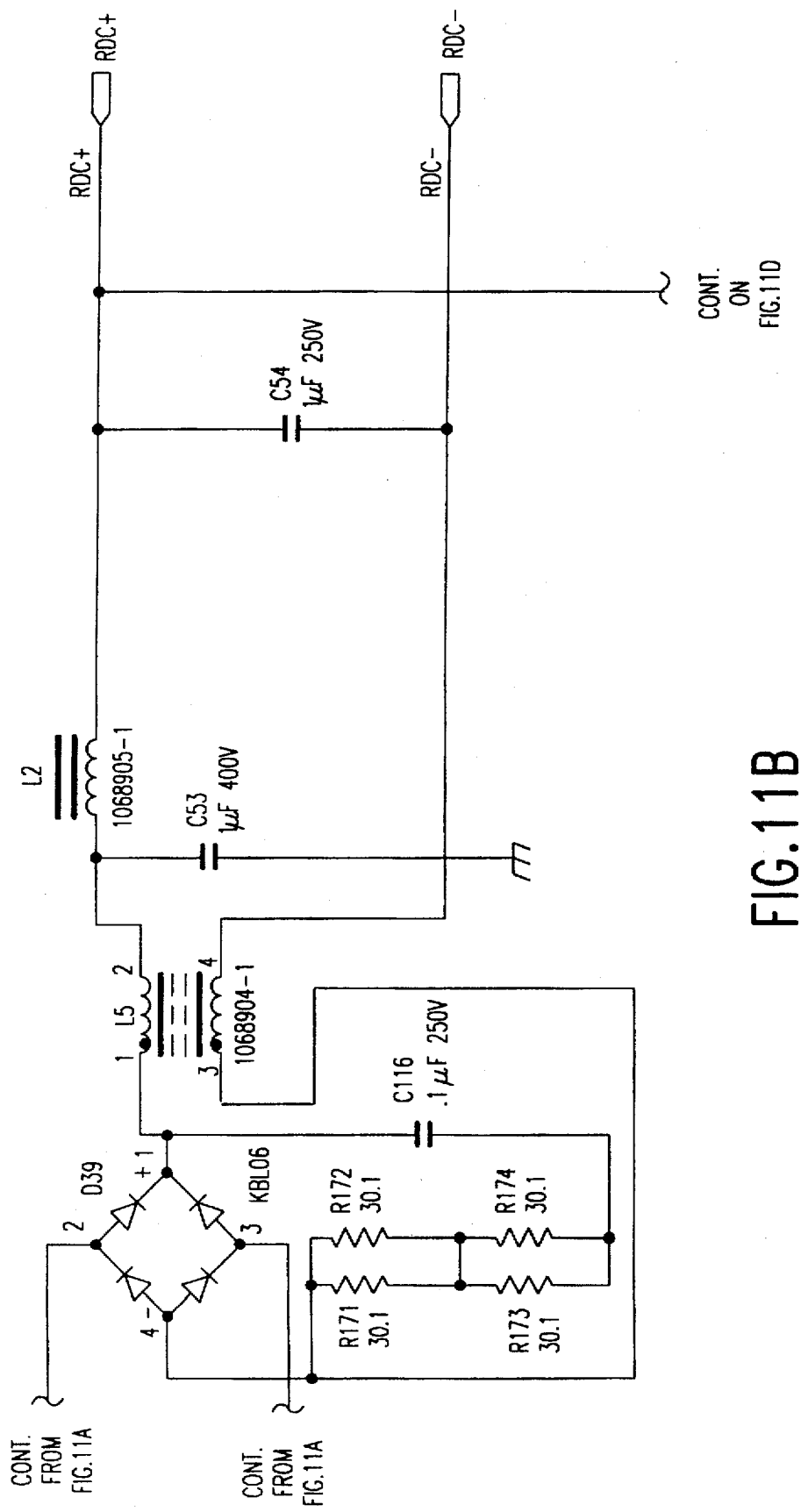
Figure 11C:
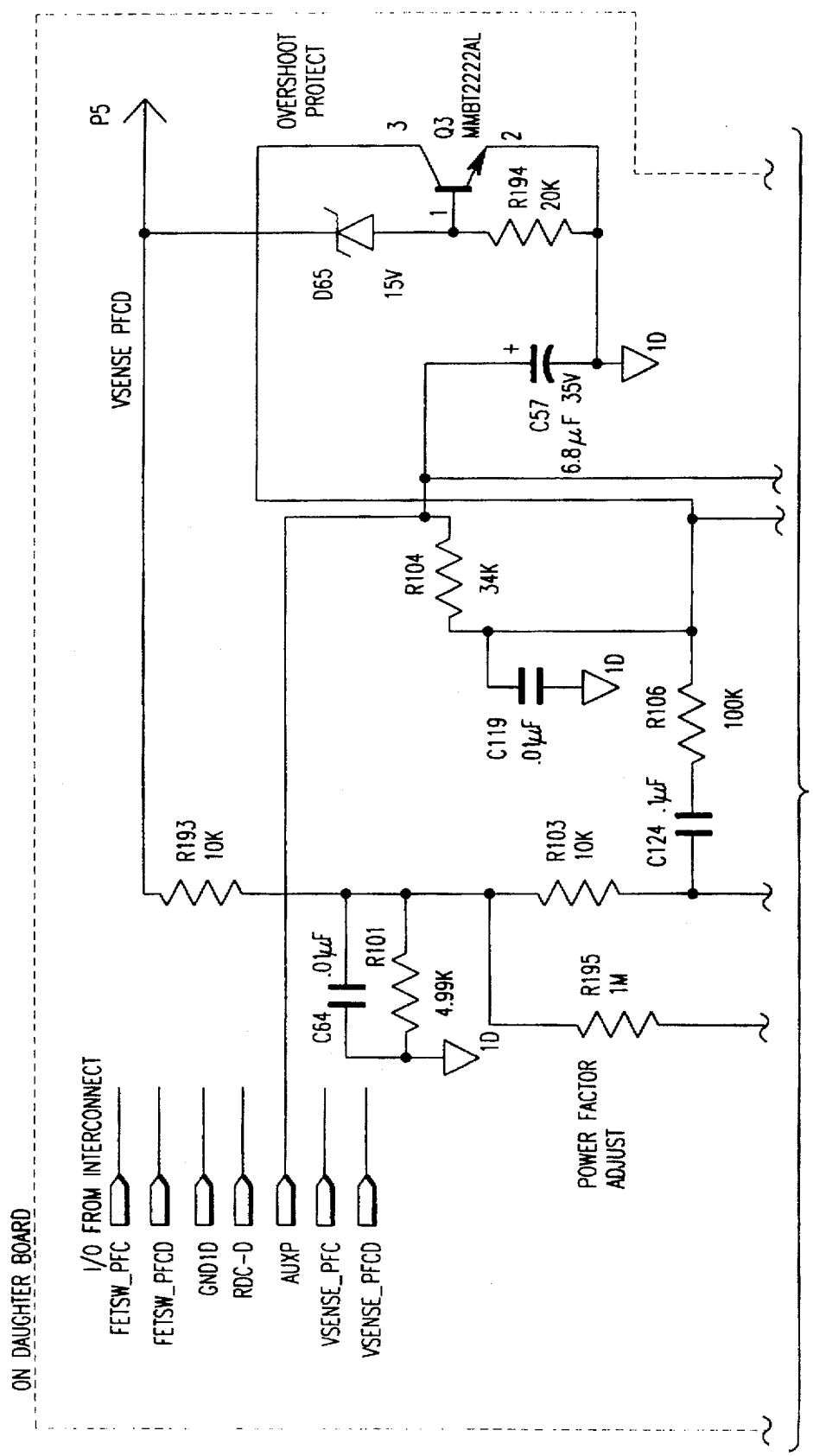
Figure 11D:
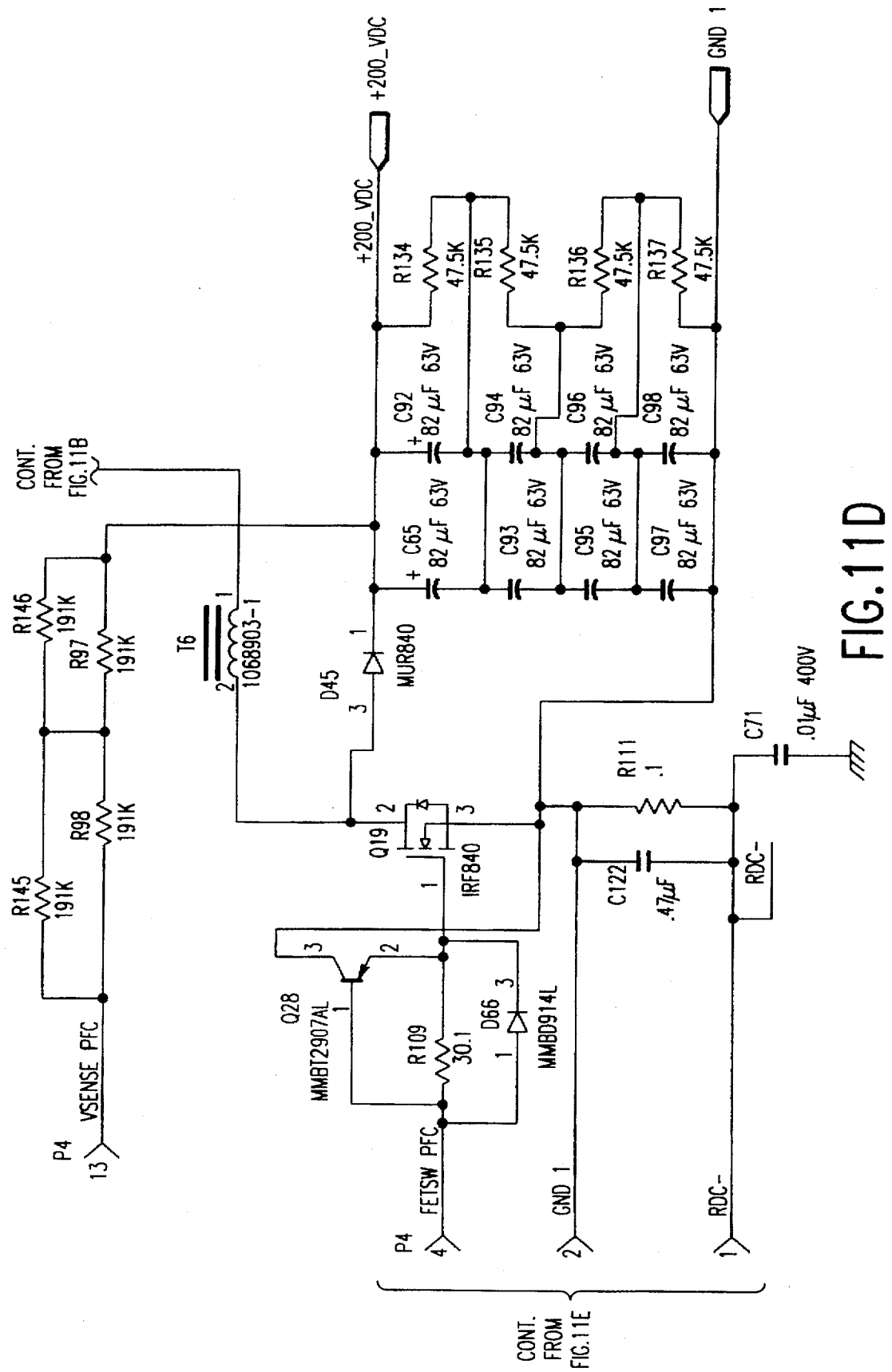
Figure 11E:
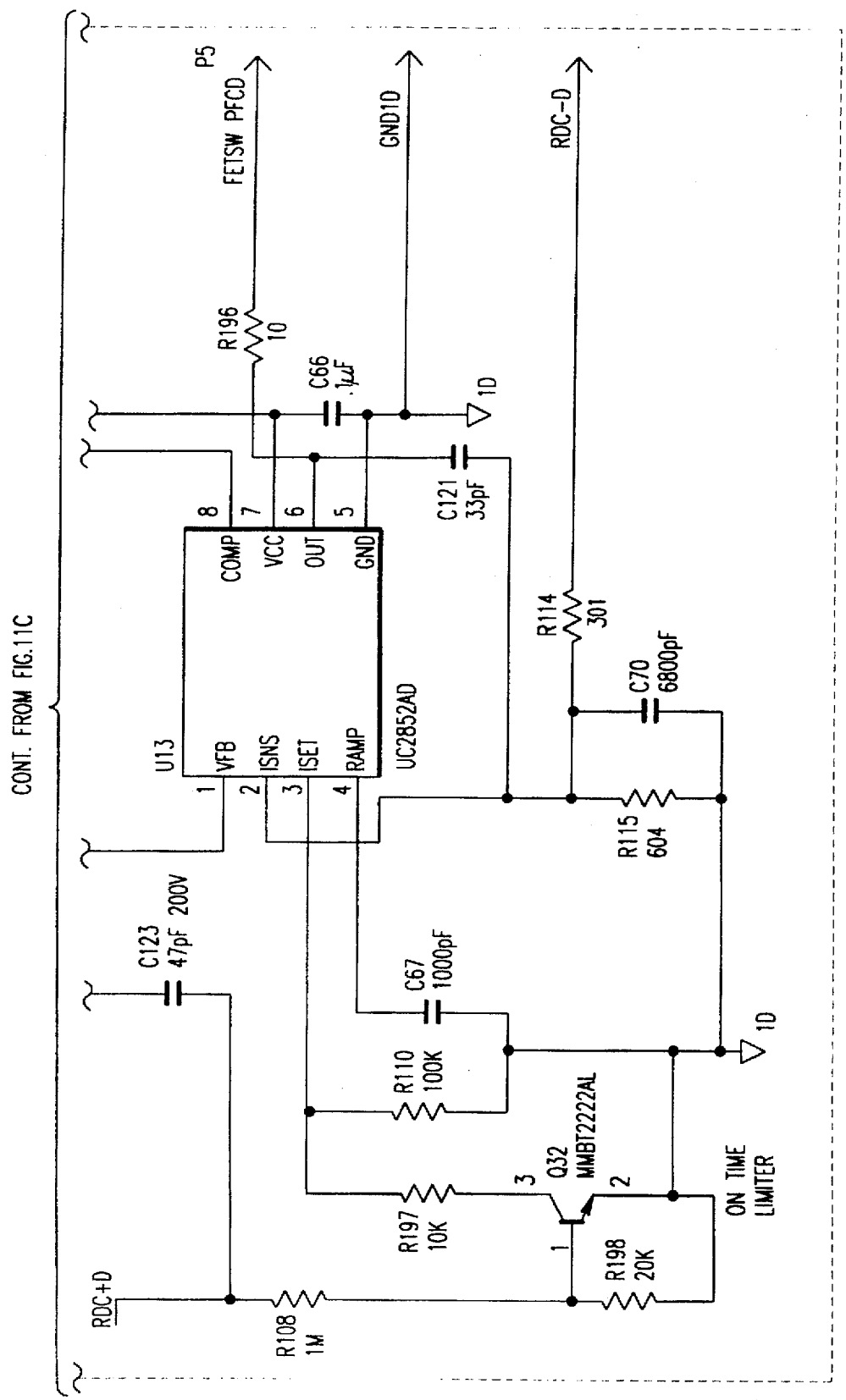
Figure 12:
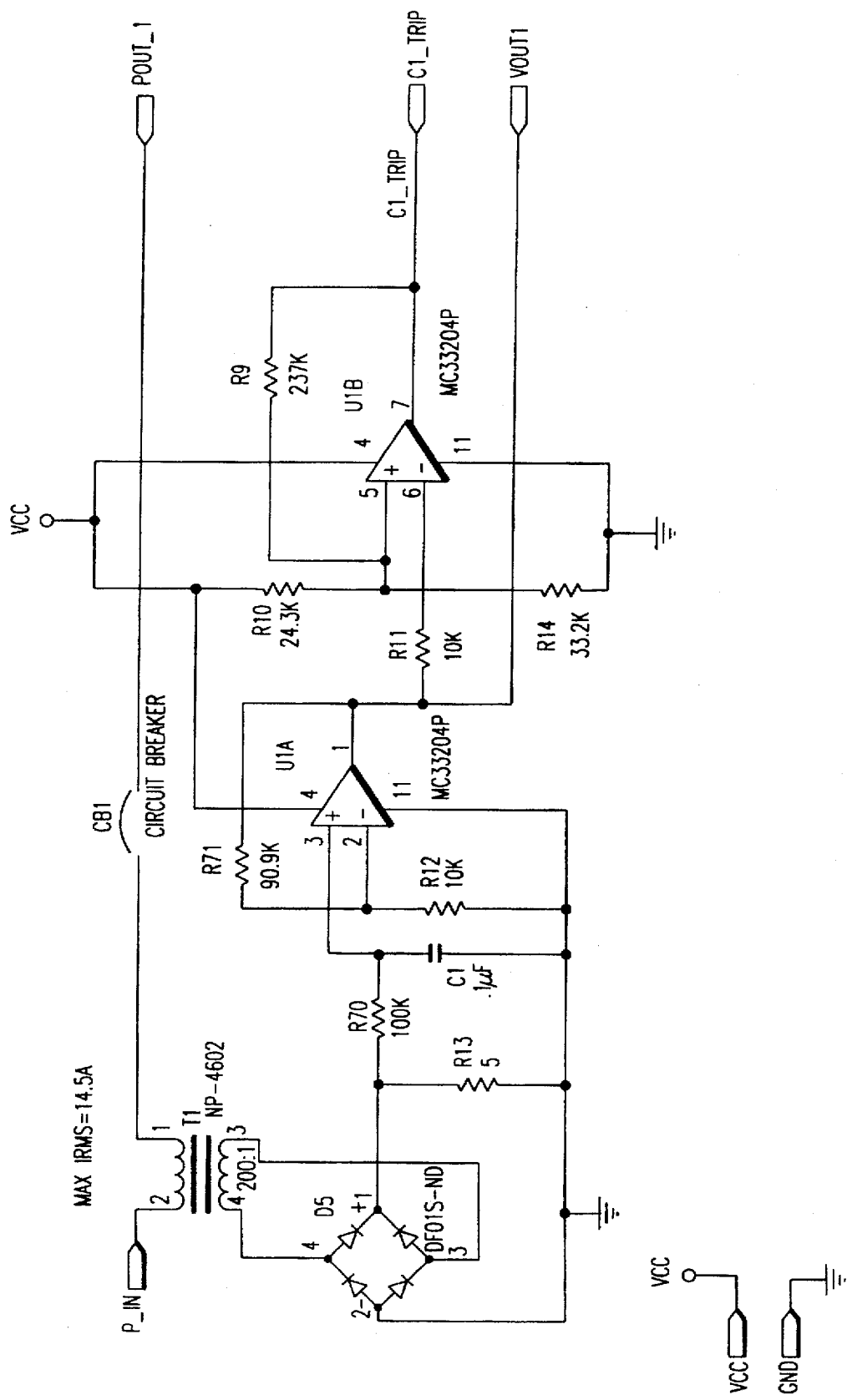
FIG. 12 is a schematic diagram of a power available circuit of FIG. 1.
Figure 13:
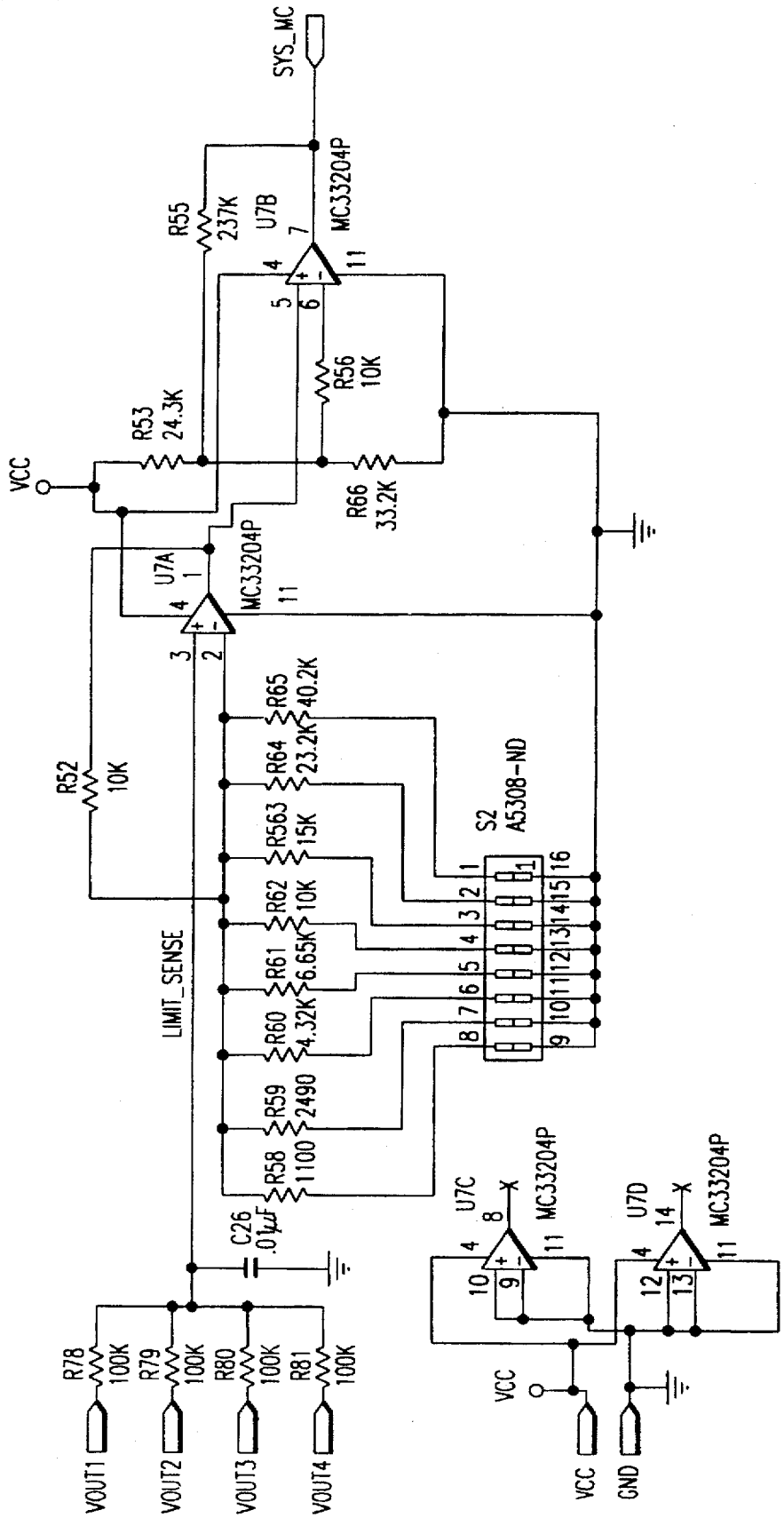
FIG. 13 is a schematic diagram of a power comparator of FIG. 1.
Figure 14:
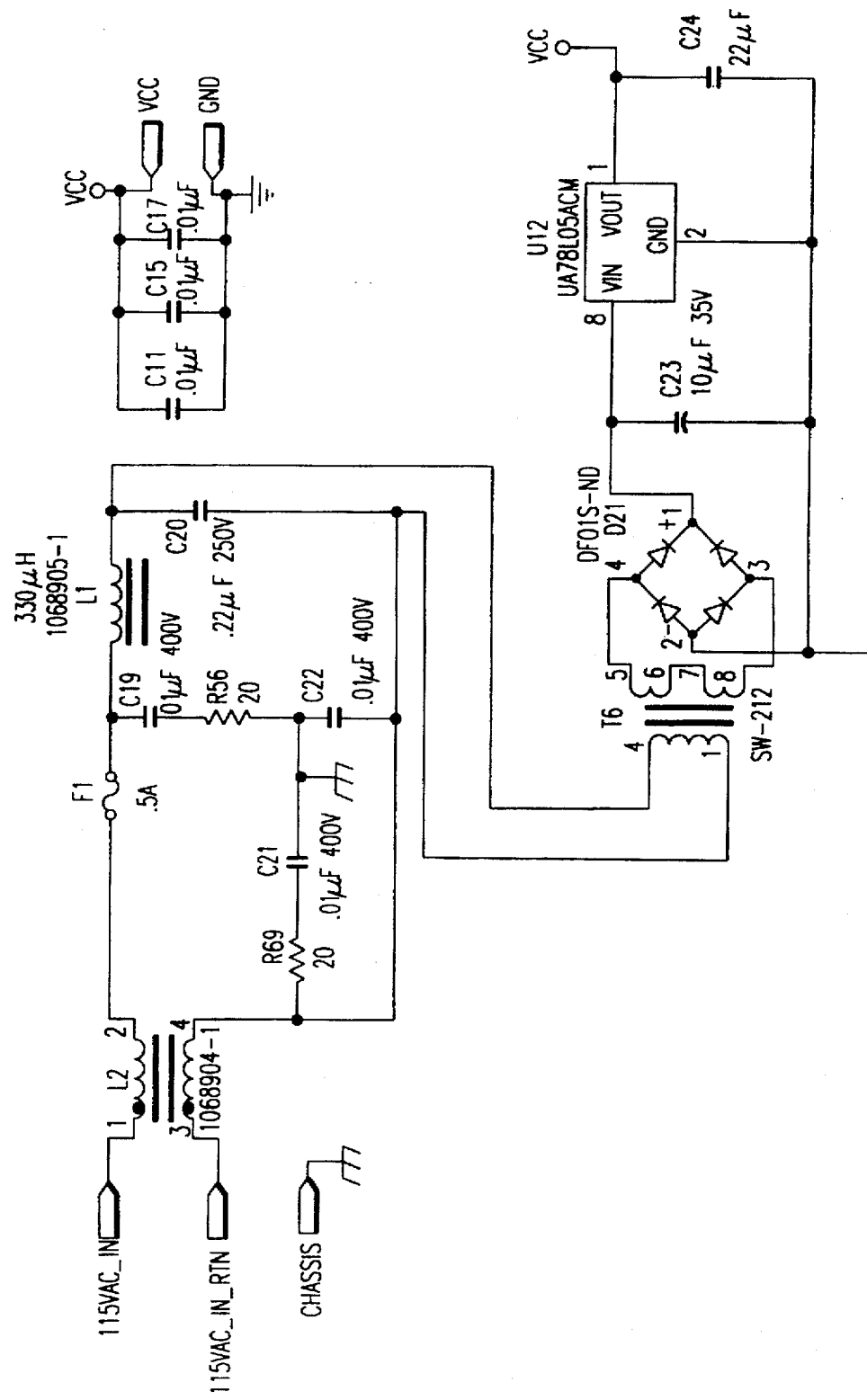
FIG. 14 is a schematic diagram of a LDMS power circuit according to the present invention.
Figure 15A:
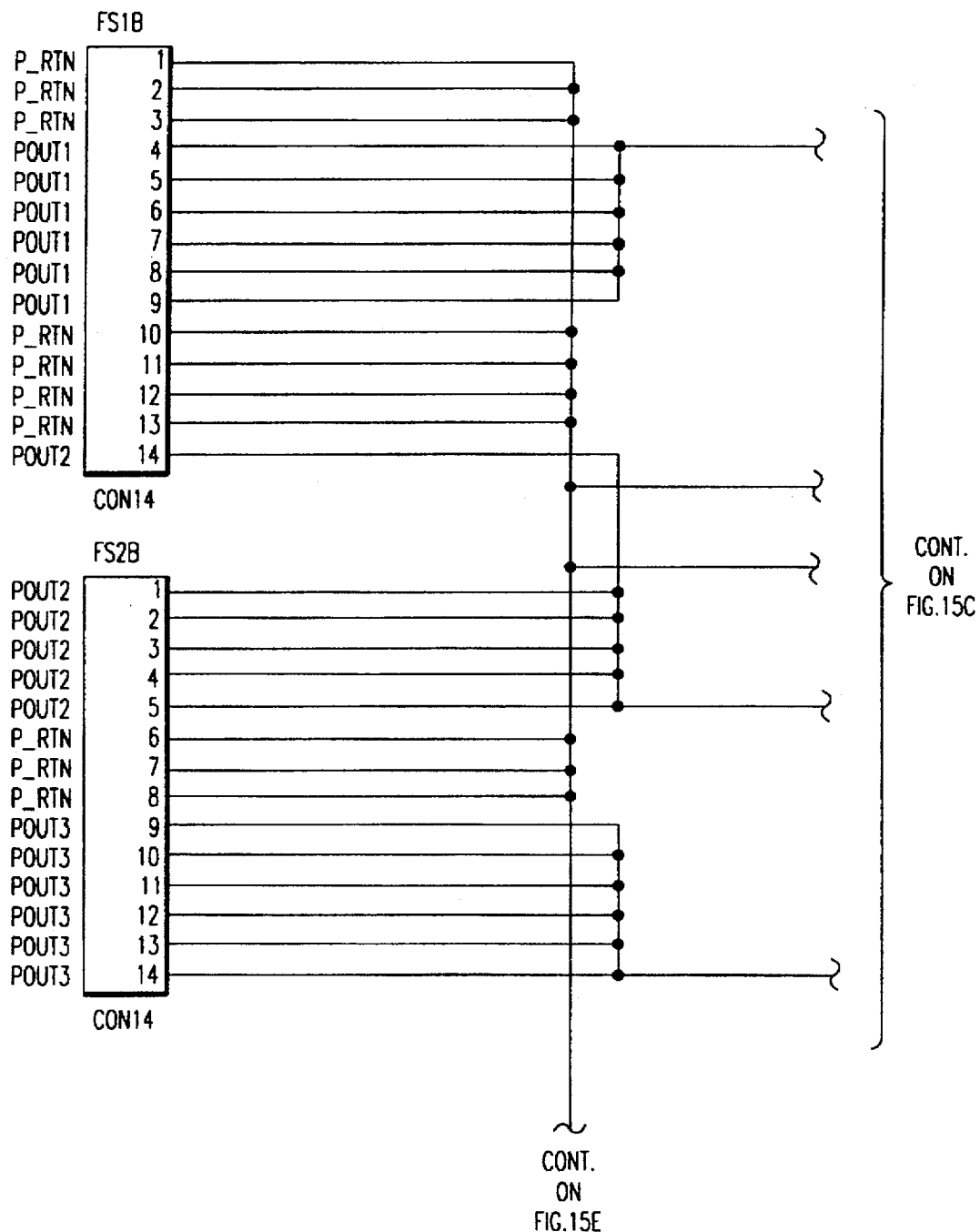
FIG. 15 is an additional schematic diagram of distribution power supply of FIG. 1.
Figure 15B:
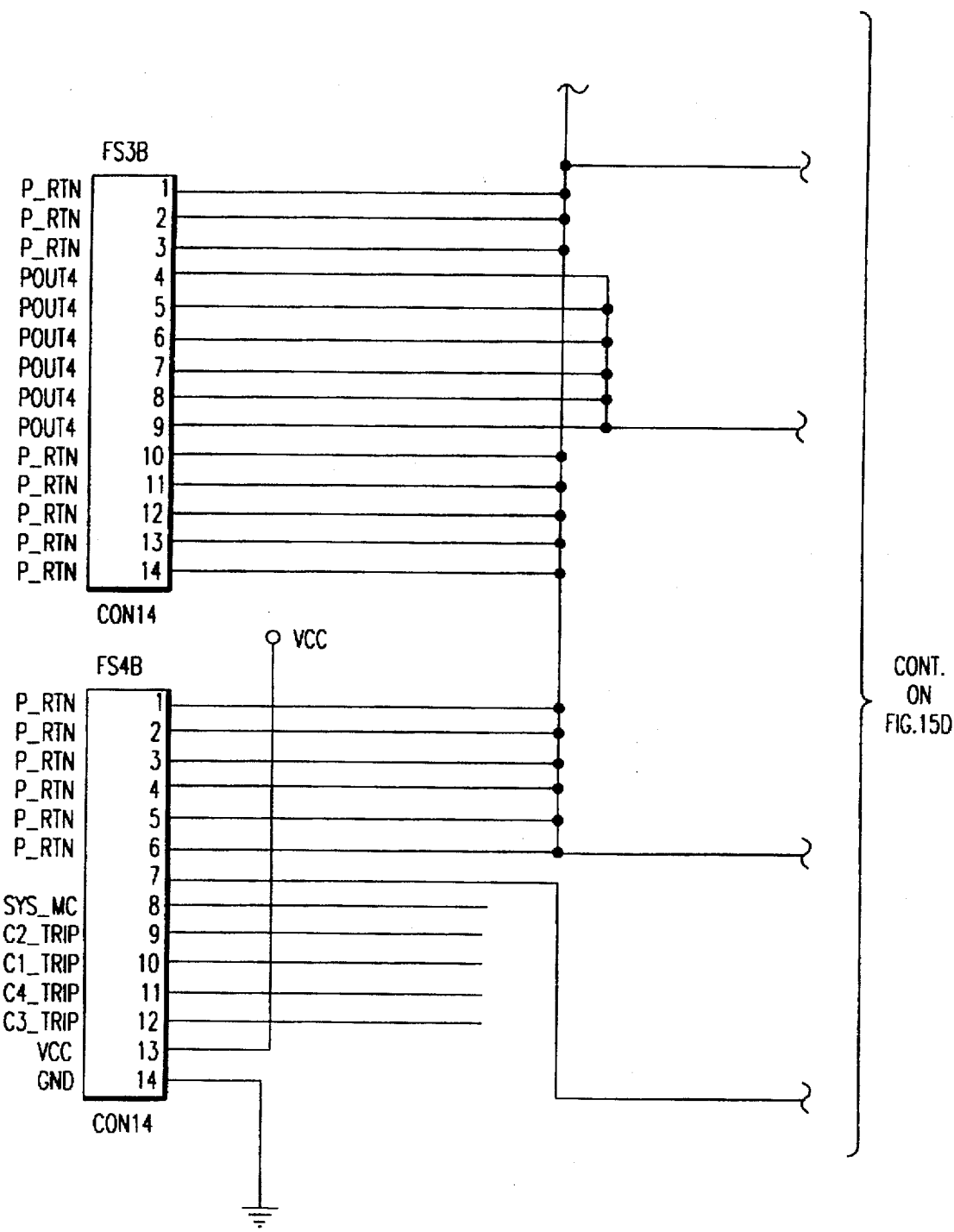
Figure 15C:
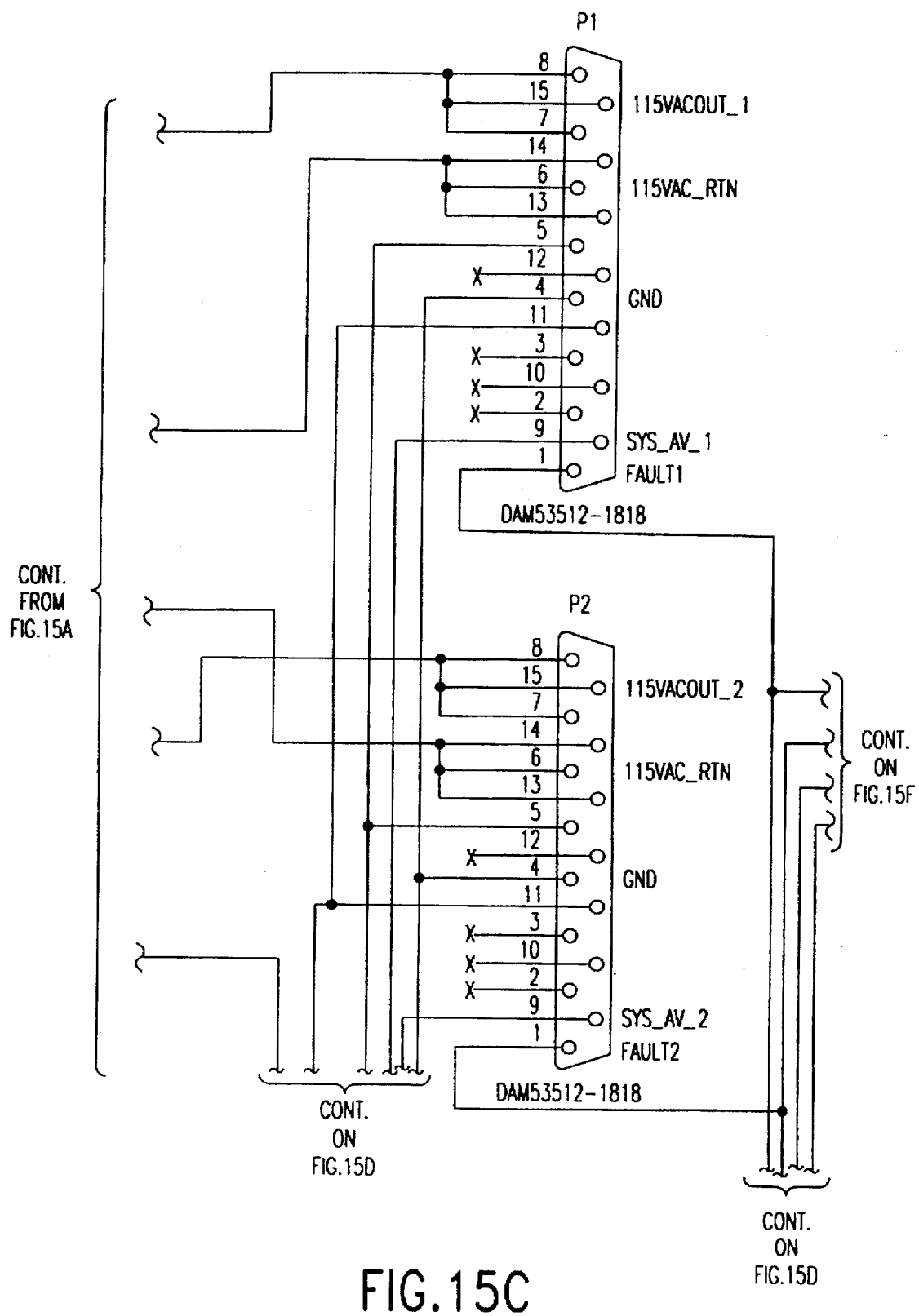
Figure 15D:
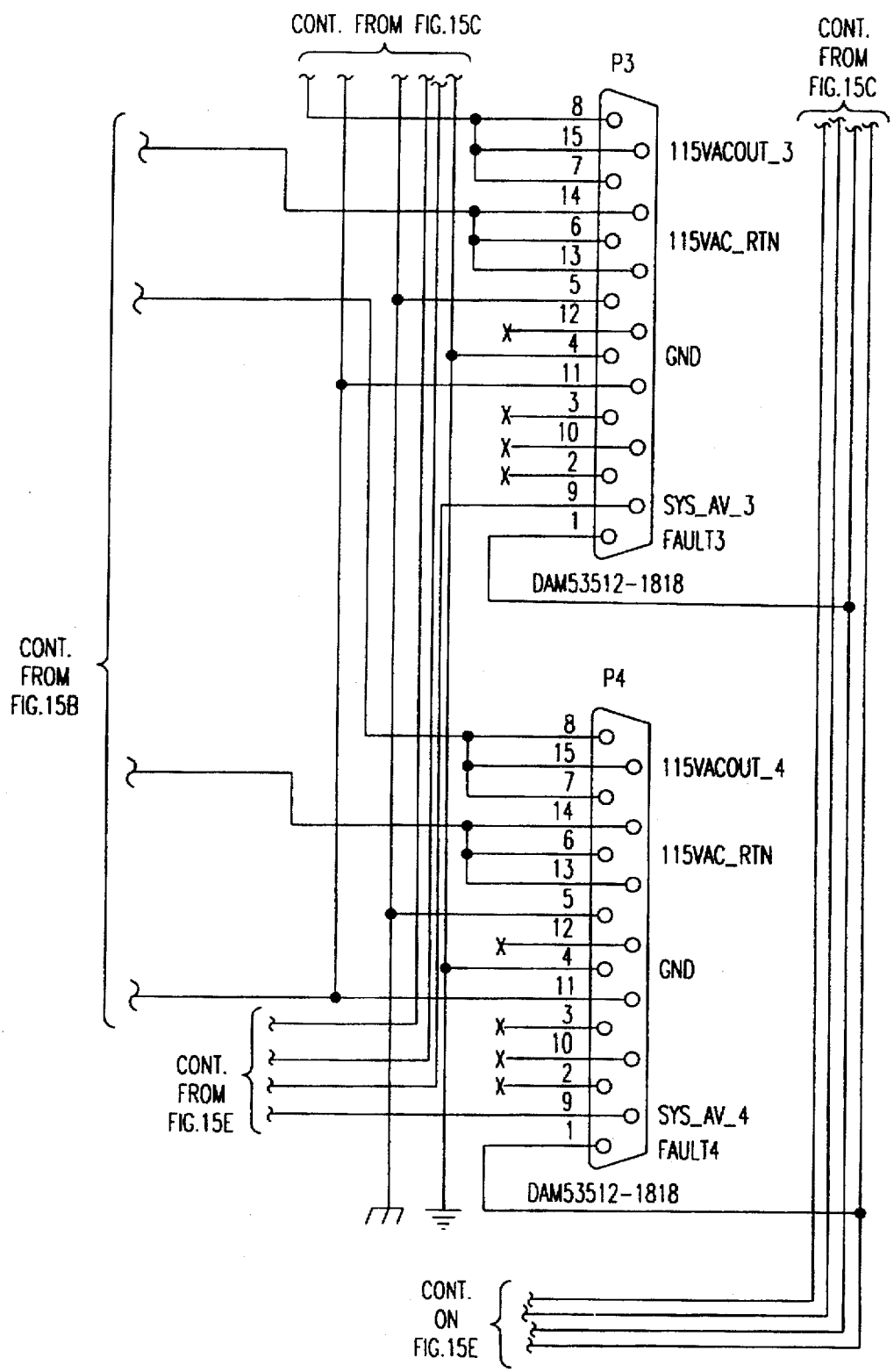
Figure 15E:
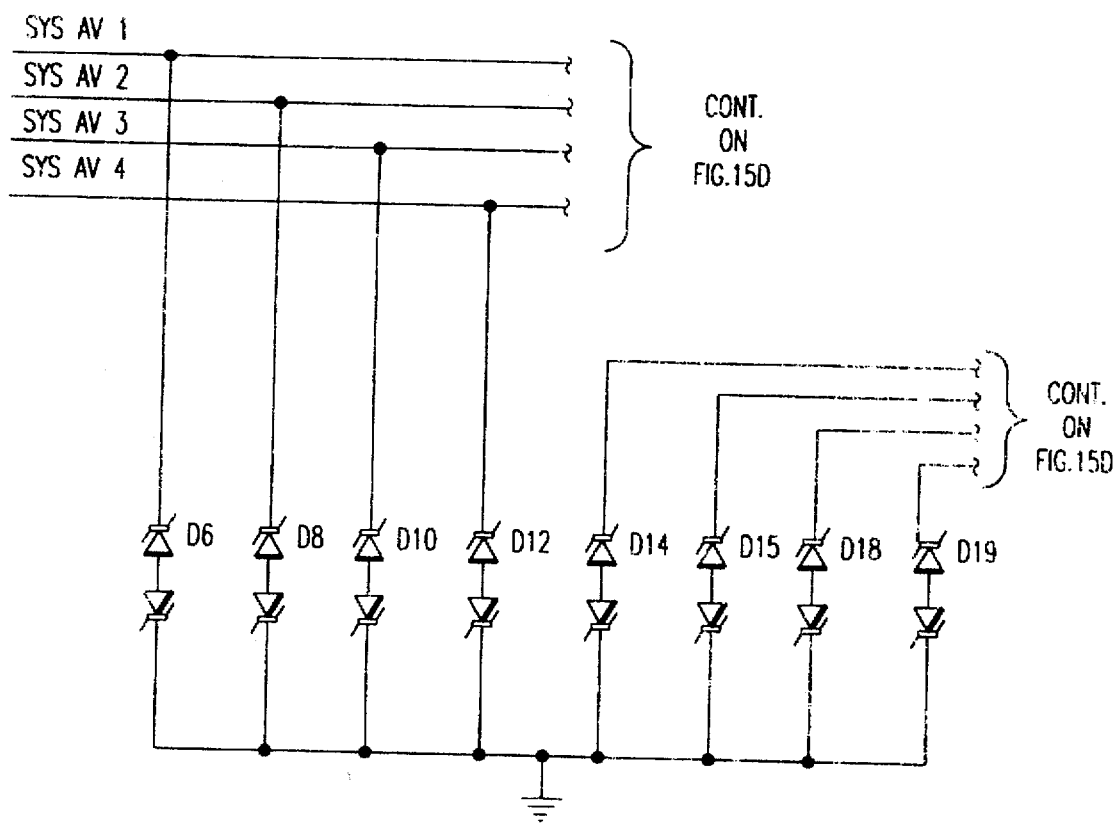
Figure 15F:
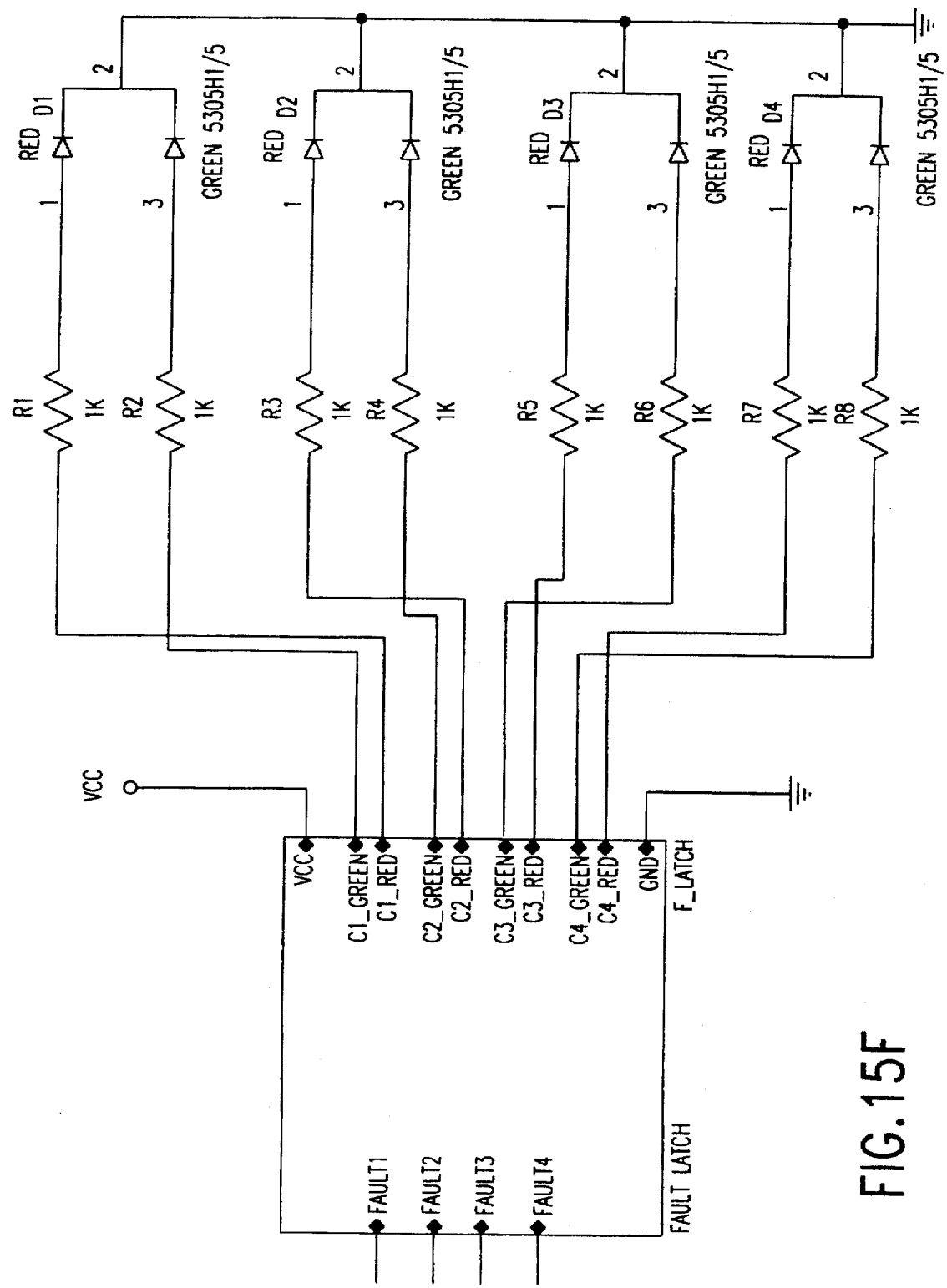
Figure 15G:
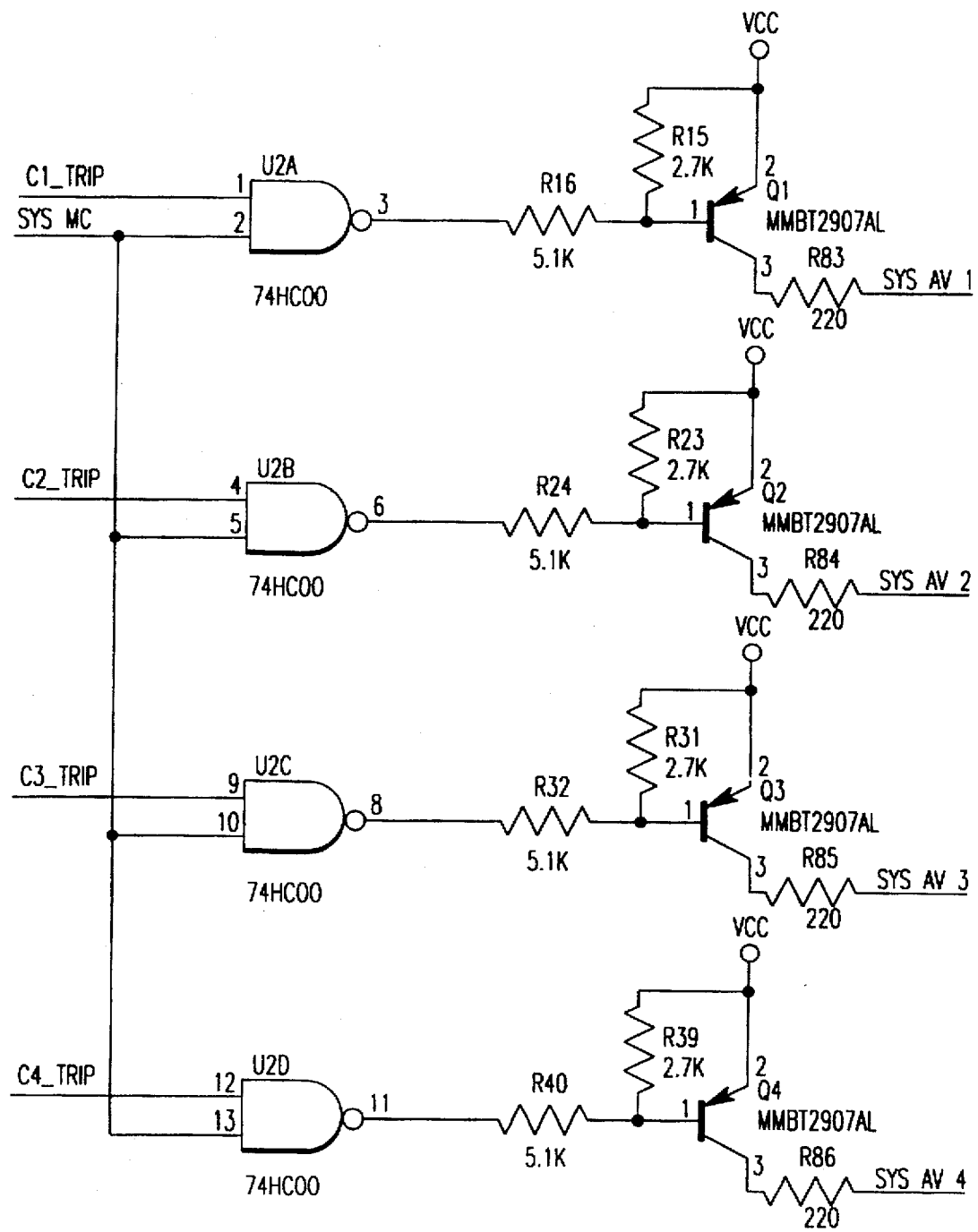
Figure 16A:
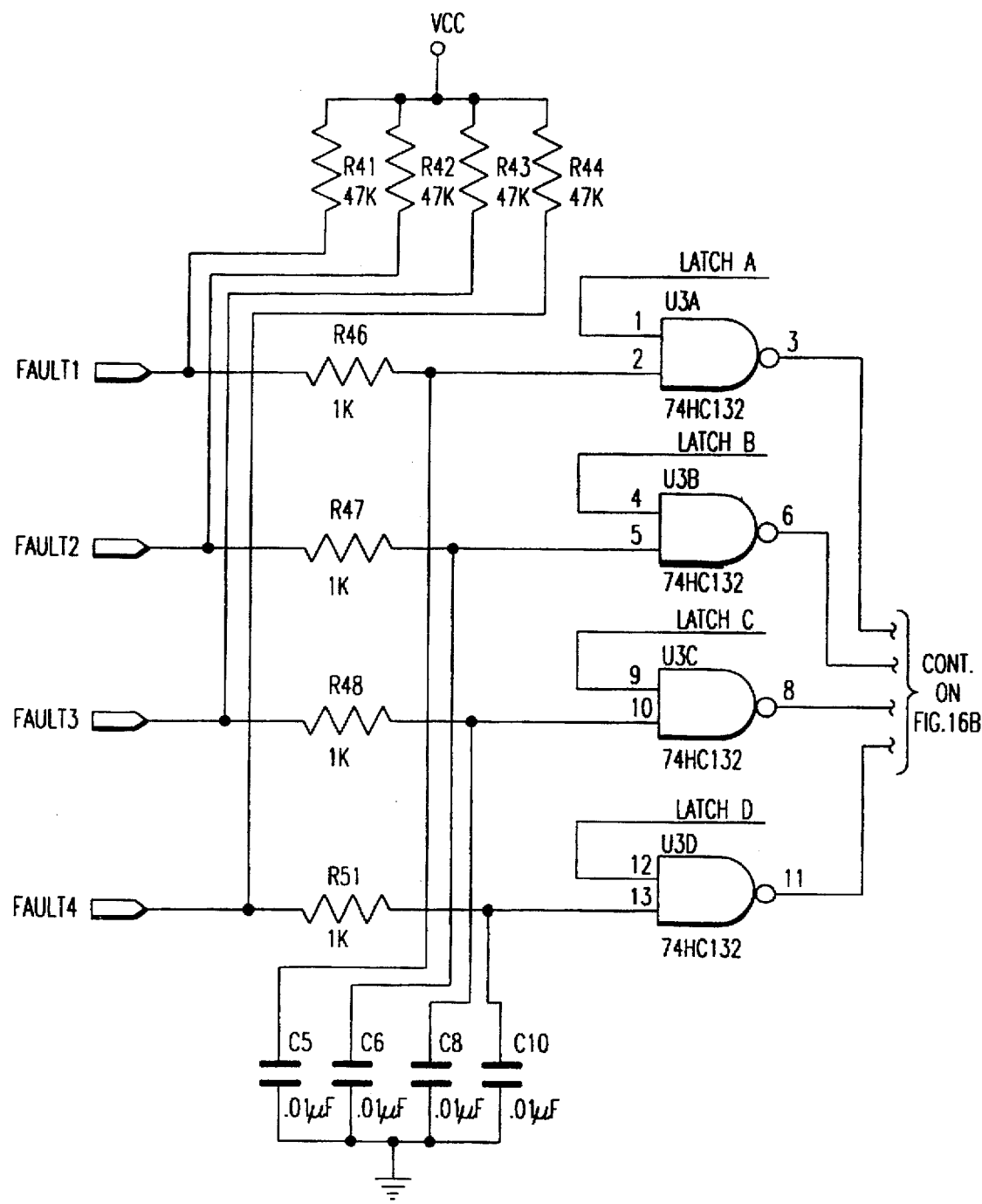
FIG. 16 is a schematic diagram of a master test circuit of FIG. 1.
Figure 16B:
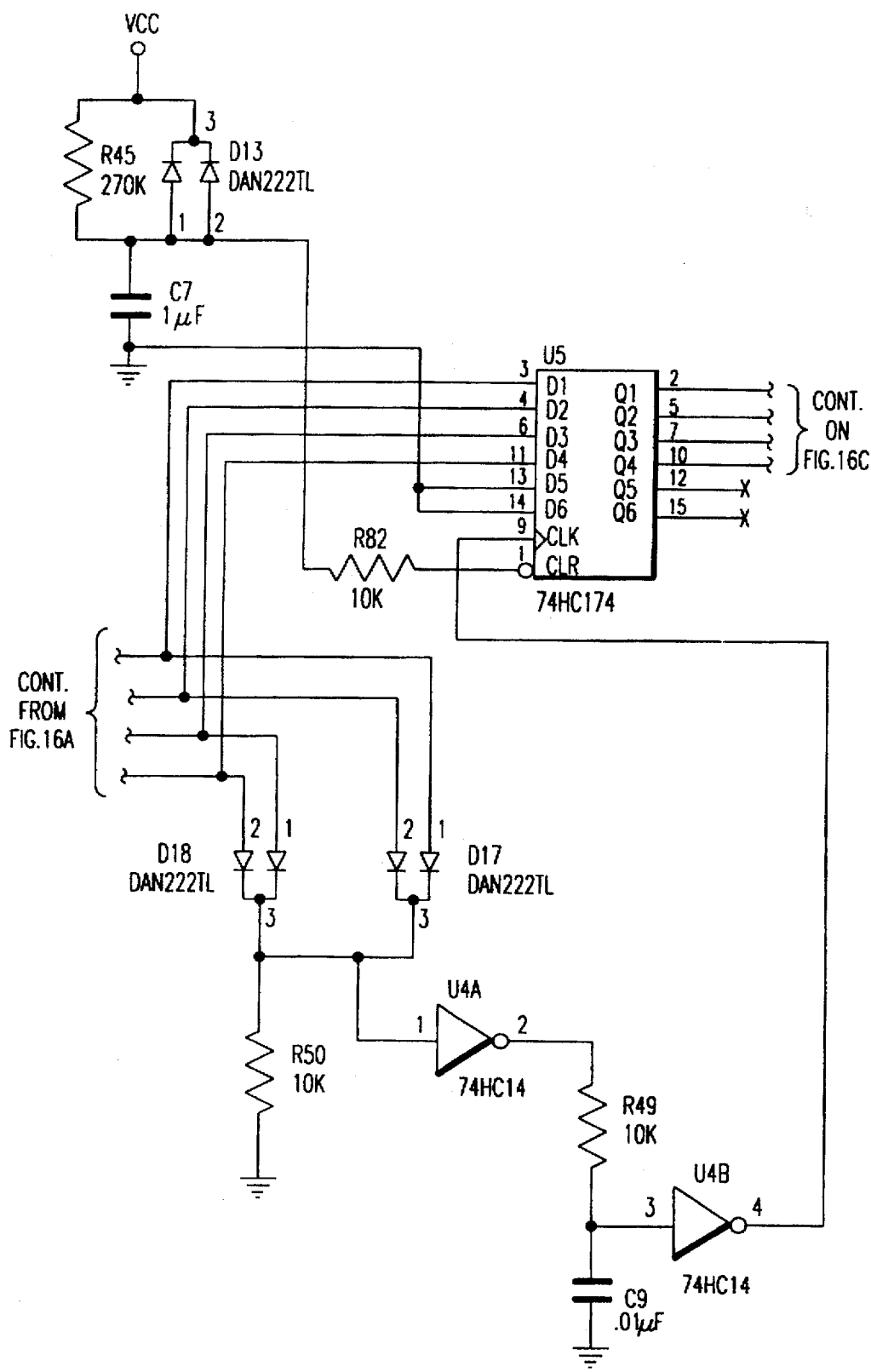
Figure 16C:
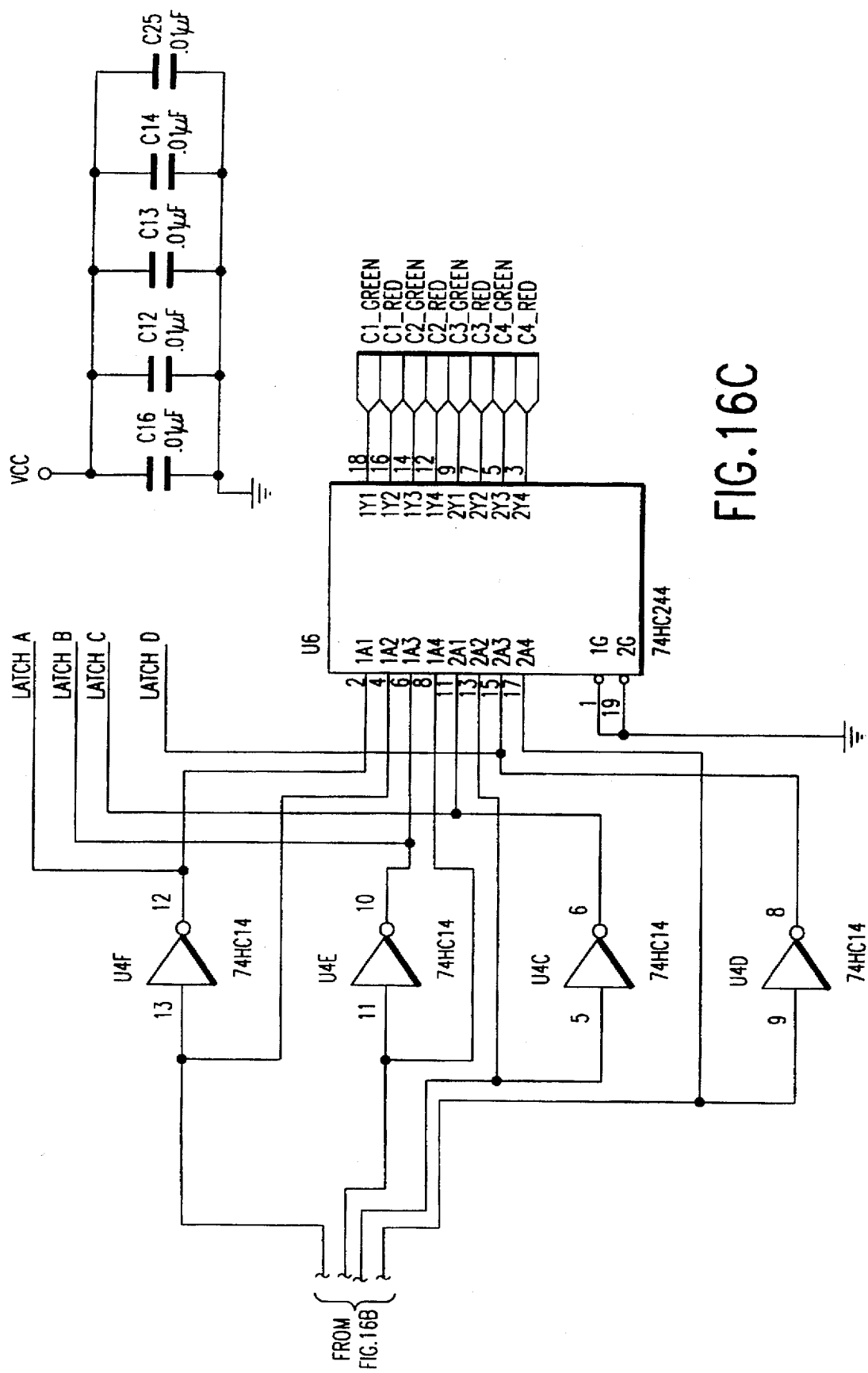

FIG. 3 illustrates in more detail a portion of power unit 14a. Referring to FIG. 3 control circuit 64 includes an external enable circuit, a power enable, and a test circuit. As herein embodied and referring to FIG. 3, control circuit 64 includes external enable circuit 98, power enable circuit 100.

External enable circuit 98 connects to power enable circuit 100 via enable line 104. Power enable circuit connects to external enable circuit 98, power available line 28a, converter 60 via enable line 78, and outlet 68 via power request line 88.

External enable circuit 98 provides on enable line 104 an additional enable signal based on predetermined criteria. Preferably external enable circuit 98 is a credit card input device that provides an enable signal on enable line 104 when a valid credit card has been accepted by external circuit 98. Alternatively, external enable circuit 98 could be any type of system providing user enable information. For example, a keypad entry device with pre-selected codes or a voice identification system. Additionally, external enable circuit 98 could be operated for each outlet in a central location so that an operator would determine which outlets to enable externally. External enable circuit 98 could also provide a continuous enable signal on line 104 in the event that an operator desired to disable or not use an external enabling device.

Power enable circuit 100 provides an enable signal on enable line 78 to operate converter 60. Power enable circuit 100 provides an enable signal on enable line 78 in response to a power request from outlet 68 over power request line 88, provided that power available line 28a indicates that power is available. Power enable circuit 100 is not responsive to the removal of a power available signal on power available line 28a to disable converter 60. Thus, power enable circuit 100 can only turn on converter 60 when additional power is available, but is not required to turn off converter 60 when additional power is unavailable.

FIG. 3 also illustrates outlet 68 in more detail. Outlet 68 includes switch 106 and plug 108. Switch 106 generates a power request on power request line 88 in response, via line 110, to a connection to plug 108 of electronic device 32a.

Switch 106 may be any type of well known switch effective to generate an electrical signal when an electronic device is connected to plug 108. One preferred implementation of switch 106 is a mechanical contact that completes a circuit when a connector is attched to plug 108.

Plug 108 provides an electrical connection to electronic device 32a of power line 74 and power return line 76 and may be implemented in well known manner. One preferred implementation is similar to an automotive power outlet, however any connection device to connect an electronic device to the outlet is equally preferred. An example, might include a wall socket typical of homes or any type of generalized connector for electrical contact.

Test circuit 72 performs a check of each of outlets 68 and 70 during initialization of the LDMS 10. When power is initially supplied to LDMS 10 by an auxiliary power supply (not shown), test circuit 72 causes power enable circuit 100 to enable power converter 60 for a time period. A preferred time period is 7 second, but any time period effective to measure the output of converter 60 on lines 74 and 76 would be sufficient. After the time period, the power output at lines 7 and 76 is measured. If the amount of power is outside an acceptable range, such as an under-voltage or an over-voltage, a fault timer in test circuit 72 starts timing. Such a preferred acceptable operating range is from about 10 volts to about 16 volts. The preferred acceptable operating range is dependant on the choice of electronic components and the type of electronic device attached to the outlets. If the power continues to remain outside the acceptable range for more than a specified time, a fault has occurred. Such a preferred range is from about 400 msec to about 600 msec. Of course, the range is dependant on the characteristics of the electronic components and electronic devices. If a fault has occurred, test circuit 72 causes power enable circuit 100 to be disabled until the fault is corrected. Any faults are communicated back to the power distribution circuit 12.

Control circuit 66, converter 62, and outlet 70 operate in a similar fashion.

In a preferred embodiment, outlets 68 and 70 contain a display 112 that indicates whether power is available. Display 112 connects to power available 28a via line 114. Display 112 may be implemented by any well known display device, such as an LED.

A preferred embodiment of converter 60 is illustrated in FIG. 4. Converter 62 is similar in operation to converter 60. As illustrated in FIG. 4, converter 60 includes a power factor circuit 116, a DC-to-DC converter 118, and a current boost circuit 120.

Power factor circuit 116 connects to power line 24a and power return line 26a and to DC-to-DC converter 118. In one preferred embodiment, power factor circuit 116 converts an AC signal to a DC signal to to make the current wave shape match the voltage wave shape and to isolate the power source from seeing any current spikes from the elctronic devices. Preferably, power factor circuit converts a 115 Volt-AC signal to a 200 V-DC circuit. Other conversions are equally preferred.

DC-to-DC converter 118 converts to high voltage signal from power factor circuit 116 to a voltage usable by electronic device 32a. For example, a preferred conversion is from 200 Volts-DC to a range from about 10 Volts-DC to about 16 Volts-DC. Most preferred, is a converions to 12 Volts-DC A current boost circuit 120 is attached to DC-to-DC converter 118 via line 121. Typically when a new electronic device begins drawing power from LDMS 10, it may have an initial current surge beyond the nominal operation range of DC-to-DC converter 118. A preferred nominal operating current of DC-to-DC is from about 5 Amps to about 7 Amps. The current surge may be several orders of magnitude higher than the nominal operating current range. Thus, DC-to-DC converter may not be able to supply the current needed by the attached electronic device 32a. Current boost circuit 120 senses an initial current surge and increases an amount of current available on lines 74 and 76 for a period of time to generally satisfy the initial current surge. A preferred increase is from about 1.5 to 2 times the nominal operating current of DC-to-DC converter 118. A preferred time period to satisfy the initial current surge is from about 40 msec to 50 msec. The time period would depend on the type of electronic device attached to the outlet.

In a preferred embodiment, converter 60, converts a 115 Volt-AC signal on lines 24a and 26a to a 12 Volt DC signal on lines 74 and 76. In this embodiment, converter 60 includes In operation LDMS 10 manages supplying a variety electronic devices 32 from a limited power supply, such as that found on an aircraft, a boat, or a railroad.

While applicable to a variety of power supply, the operation of the LDMS 10 will now be described according to a preferred embodiment applied to an aircraft.

As preferred LDMS 10 connects to the auxiliary power supply from an aircraft's turbine engines, that act as power source 16.

In a business, or coach, class of a passenger compartment of an aircraft, are rows of seats. The number of seats in each rows varies depending on the type of aircraft. This preferred embodiment is not limited to any particular type of aircraft. For each two seats, a power unit 14 would be provided, that supports two outlets. Different types of configurations are possibly and equally preferred.

During an initial power-on, the built-in-test signal is enabled on line 122 and master test circuit 42 receives a report via lines 30a, . . . 30n of the status of each of power units 14a, . . . 14n. The status of each of power units 14a, . . . 14n includes whether an under-voltage, over-voltage was detected. Such statuses may be indicated on display 40 or logged by master test circuit 42 by any well known means.

In an alternative embodiment, power unit 14a may be directly connected to power source 16. in this embodiment power unit 14a is not connected to a power distribution circuit 12. In this configuration, power available line 28a is continuosly set to indicate additional available power, such as by a jumper wire and test circuit 72 does not report fault status to distribution circuit 12. Test circuit 72 may report faults diectly to another display (not shown).

An exemplary preferred embodiment will now be described using FIGS. 1 through 3 and power unit 14a. As before, power unit 14a is exemplary and all other power units 14b, . . . 14n operate similarly.

A user desiring to power an electronic device, such as a laptop computer, game system, or the like, inserts a plug connector into plug 108 activating switch 106 via line 110. Switch 106 send a power request over power request line 88 to power enable circuit 100. Power enable circuit 100 determines whether external circuit has enabled a connection via line 104. A user may be required to enter a valid credit card number or insert a valid credit card into a credit card reader to cause external enable circuit to validate a transaction and send an enable signal over line 104 to power enable circuit 100.

Display 112 may display to the user whether power is available before the user attempts to draw power.

Power enable circuit 100 also examines power available line 28a. Power enable circuit will not generate an enable signal over line 78 to converter 60 unless all three conditions are met: (1) power is available as determined by examining line 28a; (2) external enable circuit has placed an enable signal on line 104; and (3) a power request has been received from outlet 68.

When all three conditions are met, power enable circuit 100 places an enable signal on line 78 to operate converter 60. An internal time is also activated. If the output of the converter 60 is not within a nominal operating range with a predetermined time, a fault signal is sent to power distribution circuit 12.

Upon occurrence of a fault, the power distribution circuit will log the fault, power unit 14a will remove the power available signal from line 28a, and the power enable circuit 100 will cause converter 60 to stop operating. When the user removes the power request on line 88 by disconnecting from plug 108, the circuits associated with enabling power unit 14a are reset.

Power distribution circuit 12 monitors the total amount of power being drawn by power units 14a, . . . 14n. Each of power sensing circuits 34a, . . . 34n senses the amount of power drawn by their respective power unit 14a, . . . 14n. When power comparator 38 determines that the total amount of power, given by the sum of the inputs 46a, . . . 46n exceeds a maximum load limit, power comparator removes power available signal from line 50 indicating that no more additional power is available. The maximum load limit may be a component tolerance level at which various electrical components of the power source 16 and LDMS 10 may begin to be damaged or set at some safety level below the device tolerance level.

Power comparator continues to monitor the total amount of power being drawn by power units 14a, . . . 14n. When this total amount of power drops below a hysteresis level, power comparator 38 places a power available signal back in line 50. The hysteresis level is below the maximum load limit to account for anticipated current fluctuations in electronic devices still connected.

While power comparator 38 monitors the total amount of power being drawn by LDMS 10, power sense circuits 34a, . . . 34n monitor the amount of power being drawn by its respective power unit 14a, . . . 14n. Power sense circuits 14a, . . . 14n operate by continuously measuring the amount of power being drawn by power units 14a, . . . 14n and outputting the result on lines 46a, . . . 46n. At about the same time, power sense circuits 34a, . . . 34n also compare the amount of power being drawn by power units 14a, . . . 14n to its respective power unit maximum. If the amount of power being drawn by power units 34a, . . . 34n exceeds its respective power unit maximum, power sense circuits 34a, . . . 34n indicate to its respective circuit 36a, . . . 38n that the limits has been exceeded. In response to a signal on its respective line 48a, . . . 48n, circuits 36a, . . . 36n remove the power available signal from its respective output line 28a, . . . 28n.

Power sense circuits 34a, . . . 34n remove the exceeded limit signal when the amount of power being drawn by its respective power unit 14a, . . . 14n drops below a hysteresis value that operates similarly to that found in power comparator 38.

Circuits 36a, . . . 36n place a power available signal on its respective output line 28a, . . . 28n when power is available, as indicated by line 50, and power sense circuit does not have a limit exceeded signal on circuits 36a, . . . 36n respective input lines 46a, . . . 46n.

Thus, LDMS 10 provides a system and technique for allowing a limited power supply to provide power to a plurality electronic devices of equal priority competing for the limited power resource. In effect additional device may be added until a system maximum is exceeded. No other additional device are allowed to draw power until the total amount of power has dropped to a specified level, at which time additional device may be added. Alternatively, the invention also provides a current boost system to supply extra current when a new device is added without disturbing the power drawn from the power source.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A load distribution and management system comprising:
   a power distribution circuit adapted to receive power for distributing power and indicating a current status of whether additional power is available; and
   at least one power unit connected to the power distribution circuit for providing power to at least one power outlet when additional power is available, wherein the at least one power unit comprises:
   (a) at least one power converter connected to the power distribution circuit;
   (b) a control circuit connected to each of the at least one power converter, to each power outlet, and to the power distribution circuit for operating each of the at least one power converter in response to a power request signal and at least information unrelated to whether additional power is available when additional power is available, and the power outlet further comprises:
   (i) a power request circuit connected to each of the control circuits for generating the power request signal; and
   (ii) a connector connected to each of at least one power converters for supplying power to an electronic device.

2. The apparatus of claim 1, wherein the power distribution circuit comprises:
   (a) a power input for receiving power;
   (b) a power sense circuit connected between the power input and each at least one power unit for sensing the current amount of power drawn by each at least one power unit;
   (c) a total power sense circuit connected to each of the power sense circuits for determining the total current amount of power drawn by each of the at least one power units;
   (d) a maximum power available circuit for supplying a maximum amount of power available; and
   (e) a comparator connected to the total power sense circuit and the maximum power available circuit for comparing the total amount of power and the maximum amount of power and indicating the current status of whether additional power is available.

3. The apparatus of claim 2, wherein the comparator includes a hysteresis circuit for indicating that additional power is available until the total amount of power is equal to or greater than a first power level below the maximum amount of power available and not indicating that additional power is available until the total amount of power is less than a second power level.

4. The apparatus of claim 1, wherein the control circuit comprises:
   (a) an external enable circuit for producing an outlet enable signal for operating the outlet in response to at least information unrelated to whether additional power is available;
   (b) a power enable circuit connected to the power distribution circuit, the converter, the external enable circuit, and the outlet for operating the converter to supply power to the outlet when additional power is available, a power request is received from the outlet, and an outlet enable signal is present.

5. The apparatus of claim 1, wherein the at least one power unit further comprises a display circuit connected to the power distribution circuit for indicating whether additional power is available.

6. The apparatus of claim 1, wherein each the at least one power unit includes a test circuit for indicating faults, and the power distribution circuit further includes a master test circuit for indicating whether any power unit has a fault.

7. The apparatus of claim 1, further comprising a current boost circuit for providing temporary additional power when power is started to an outlet.

8. A power supply unit for delivering power from a power supply source comprising:
   (a) at least one power converter connected to the power supply source;
   (b) at least one outlet connected to each at least one power converter comprising:
   a power request circuit for generating a power request signal; and
   a connector connected to each of at least one power converters for supplying power to an electronic device; and
   (c) a control circuit connected to each of at least one power converter, to each of at least one power outlet for operating each of at least one power converter in response to a power request signal and at least information unrelated to whether additional power is available.

9. The apparatus of claim 8, wherein each of the control circuits comprises:
   (a) an external enable circuit for producing an outlet enable signal for operating the at least one outlet in response to at least information unrelated to whether additional power is available;
   (b) a power enable circuit connected to the converter, the external enable circuit, and the outlet for operating the converter to supply power to the outlet when power request is received from the outlet, and an outlet enable signal is present.

10. The apparatus of claim 8, further comprising a current boost circuit for providing temporary additional power when power is started to an outlet.

* * * * *